(12) United States Patent
Vaze et al.

(10) Patent No.: US 11,082,920 B2
(45) Date of Patent: Aug. 3, 2021

(54) POWER SAVINGS WHILE PERFORMING MULTIPLE CONCURRENT CELL SEARCHES

(71) Applicant: QUALCOMM Incorporated, San Diego, CA (US)

(72) Inventors: Chinmay Shankar Vaze, San Diego, CA (US); Arvind Vardarajan Santhanam, San Diego, CA (US); Yongle Wu, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 55 days.

(21) Appl. No.: 16/509,198

(22) Filed: Jul. 11, 2019

(65) Prior Publication Data
US 2021/0014785 A1 Jan. 14, 2021

(51) Int. Cl.
*H04W 52/02* (2009.01)
*H04W 36/00* (2009.01)
*H04W 48/16* (2009.01)

(52) U.S. Cl.
CPC ... *H04W 52/0216* (2013.01); *H04W 36/0058* (2018.08); *H04W 36/0069* (2018.08); *H04W 36/00835* (2018.08); *H04W 48/16* (2013.01)

(58) Field of Classification Search
None
See application file for complete search history.

(56) References Cited

U.S. PATENT DOCUMENTS

| | | | |
|---|---|---|---|
| 2015/0201434 A1* | 7/2015 | Fang | H04W 74/0816 370/335 |
| 2016/0301517 A1 | 10/2016 | Da | |
| 2016/0302098 A1 | 10/2016 | Gheorghiu et al. | |
| 2018/0317114 A1* | 11/2018 | Kim | H04L 1/1685 |
| 2018/0324678 A1 | 11/2018 | Chen et al. | |
| 2018/0368088 A1 | 12/2018 | Nagaraja et al. | |
| 2020/0162939 A1* | 5/2020 | Kim | H04W 56/001 |
| 2020/0212943 A1* | 7/2020 | Banin | H04L 25/49 |

OTHER PUBLICATIONS

International Search Report and Written Opinion—PCT/US2020/070222—ISA/EPO—dated Oct. 9, 2020.

* cited by examiner

*Primary Examiner* — Saumit Shah
(74) *Attorney, Agent, or Firm* — Qualcomm Incorporated

(57) ABSTRACT

Methods, systems, and devices for wireless communications are described. A user equipment (UE) may identify a set of base stations that are part of a synchronization group, where at least two of the base stations in the set of base stations operate on different frequencies. In some cases, the UE may identify the set of base stations based on an indication transmitted by a serving base station for the UE. Additionally, once the synchronization group is identified, the UE may schedule synchronization signals together from the set of base stations. For example, after identifying the set of base stations, the UE may identify a measurement timing window associated with the synchronization group and measure a respective synchronization signal for each base station within the measurement timing window. Accordingly, the UE may then transmit a measurement report to the serving base station that includes the synchronization signal measurements.

30 Claims, 18 Drawing Sheets

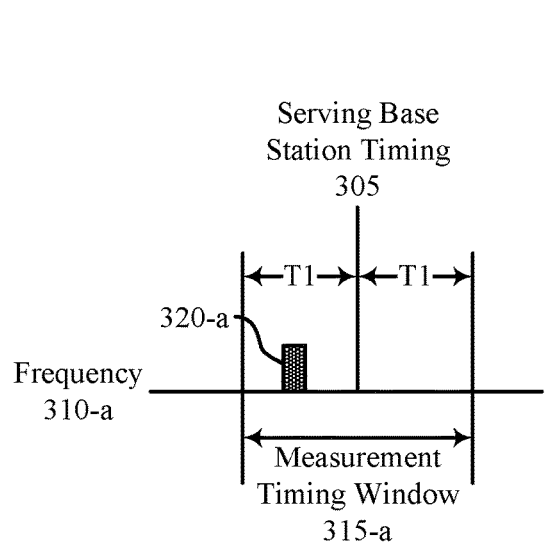
FIG. 3A
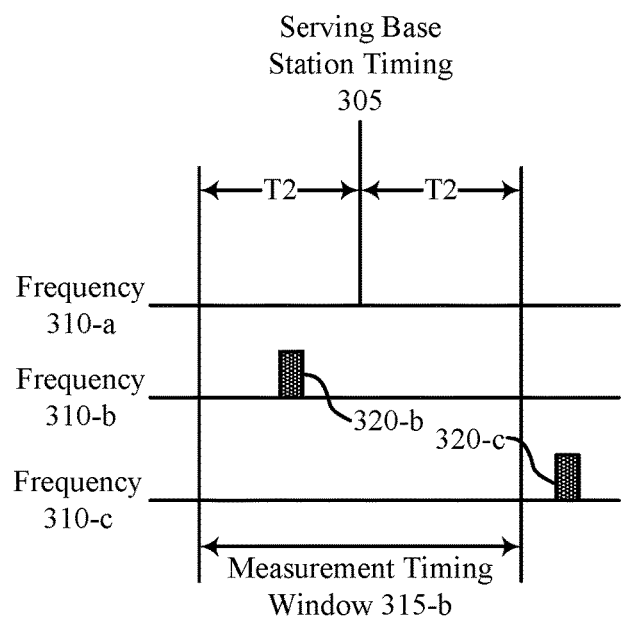
FIG. 3B
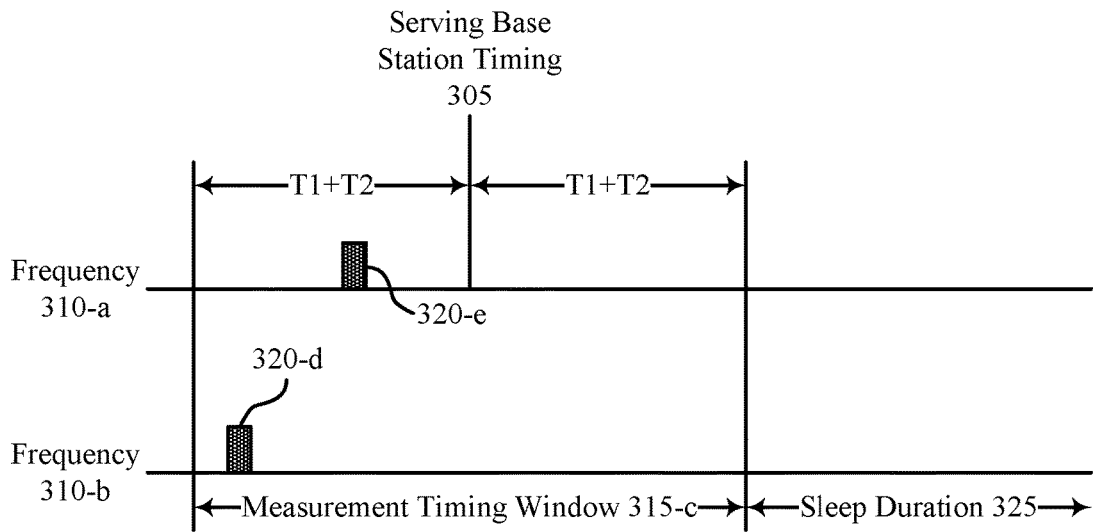
FIG. 3C
 Synchronization Signal Measurement

POWER SAVINGS WHILE PERFORMING MULTIPLE CONCURRENT CELL SEARCHES

BACKGROUND

The following relates generally to wireless communications, and more specifically to power savings while performing multiple concurrent cell searches.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a UE may perform cell search and measurement to identify base stations operating nearby for enabling carrier aggregation or to switch communications from a first base station to a second base station (e.g., handover based on moving into a coverage area of the second base station, from a first radio access technology (RAT) to a second RAT, a better available connection with the second base station, etc.). Accordingly, the UE may search and measure different frequencies of one or more neighboring base stations to facilitate carrier aggregation and handover determinations. For example, based on measuring the different frequencies, the UE may identify and report channel conditions for enabling carrier aggregation or to enable handover to a suitable neighboring base station. Efficient techniques are desired to accommodate cell search and frequency band measurement.

SUMMARY

The described techniques relate to improved methods, systems, devices, and apparatuses that support power savings while performing multiple concurrent cell searches. Generally, the described techniques provide for a user equipment (UE) to identify a set of base stations (e.g., two or more base stations) that are part of a synchronization group, where at least two of the base stations in the set of base stations operate on different frequencies (e.g., at least a first base station operates on a first frequency that is different than a second frequency for a second base station). In some cases, the UE may identify the set of base stations based on an indication transmitted by a serving base station to the UE, where the serving base station is one of the set of base stations that are part of the synchronization group. Additionally, once the synchronization group is formed/identified, the UE may start to implement a timing transfer for future searches and measurements for synchronization signals from the set of base stations (e.g., the UE schedules monitoring for synchronization signal transmissions from the same synchronization group within a same time duration). For example, after identifying the set of base stations, the UE may identify a measurement timing window associated with the synchronization group and measure a respective synchronization signal for each base station in the set of base stations within the measurement timing window.

Accordingly, the UE may then transmit a measurement report to the serving base station that includes the respective synchronization signal measurements. In some cases, the measurement report may enable the serving base station to initiate a handover procedure for the UE to switch communications with another base station in the set of base stations of the synchronization group. Additionally, receiving and measuring the respective synchronization signals within the measurement timing window may allow the UE to cycle between a measurement power state during the measurement timing window and a low power state outside of the measurement timing window, thereby saving power at the UE.

In some cases, the UE (e.g., and serving base station or additional base stations) may identify the measurement timing window based on identifying a symbol timing tolerance condition for a band, an intra-band carrier aggregation (CA) tolerance condition, and/or a timing of the serving base station, where a duration and location of the measurement timing window may be identified based on the symbol timing tolerance condition for the band, the intra-band CA tolerance condition, the timing of the serving base station, or a combination thereof. Subsequently, when measuring the synchronization signals in the measurement timing window, the UE may generate synchronization signal measurements for each of the base stations in the set of base stations on a same or on different frequency layers (e.g., a frequency band may include multiple frequency layers and the UE may perform measurements concurrently on multiple frequency layers of the same frequency band).

A method of wireless communications by a UE is described. The method may include identifying a set of base stations (e.g., two or more base stations) that are included in a synchronization group, where at least a first base station of the set of base stations operates on a first frequency that is different than a second frequency on which a second base station of the set of base stations operates, identifying a measurement timing window corresponding to the synchronization group, measuring, within the measurement timing window, a respective synchronization signal for each base station of the set of base stations, and transmitting a measurement report that indicates a set of synchronization signal measurements.

An apparatus for wireless communications by a UE is described. The apparatus may include a processor, memory coupled with the processor, and instructions stored in the memory. The instructions may be executable by the processor to cause the apparatus to identify a set of base stations that are included in a synchronization group, where at least a first base station of the set of base stations operates on a first frequency that is different than a second frequency on which a second base station of the set of base stations operates, identify a measurement timing window corresponding to the synchronization group, measure, within the measurement timing window, a respective synchronization signal for each base station of the set of base stations, and transmit a measurement report that indicates a set of synchronization signal measurements.

Another apparatus for wireless communications by a UE is described. The apparatus may include means for identifying a set of base stations that are included in a synchronization group, where at least a first base station of the set of base stations operates on a first frequency that is different than a second frequency on which a second base station of the set of base stations operates, identifying a measurement timing window corresponding to the synchronization group, measuring, within the measurement timing window, a respective synchronization signal for each base station of the set of base stations, and transmitting a measurement report that indicates a set of synchronization signal measurements.

A non-transitory computer-readable medium storing code for wireless communications by a UE is described. The code may include instructions executable by a processor to identify a set of base stations that are included in a synchronization group, where at least a first base station of the set of base stations operates on a first frequency that is different than a second frequency on which a second base station of the set of base stations operates, identify a measurement timing window corresponding to the synchronization group, measure, within the measurement timing window, a respective synchronization signal for each base station of the set of base stations, and transmit a measurement report that indicates a set of synchronization signal measurements.

Some examples of the method, apparatuses, and non-transitory computer-readable medium described herein may further include operations, features, means, or instructions for cycling between operating in a measurement power state during the measurement timing window and a lower power state outside of the measurement timing window.

In some examples of the method, apparatuses, and non-transitory computer-readable medium described herein, identifying the measurement timing window may include operations, features, means, or instructions for identifying a symbol timing tolerance condition for a band and an intra-band CA tolerance condition, and identifying a duration of the measurement timing window based on the symbol timing tolerance condition for the band and the intra-band CA tolerance condition.

In some examples of the method, apparatuses, and non-transitory computer-readable medium described herein, identifying the measurement timing window may include operations, features, means, or instructions for identifying a timing of a serving base station, and identifying a location of the measurement timing window in time based on the timing of the serving base station.

In some examples of the method, apparatuses, and non-transitory computer-readable medium described herein, measuring the synchronization signal for each base station of the set of base stations may include operations, features, means, or instructions for generating a synchronization signal measurement for each base station of the set of base stations on a same frequency layer.

In some examples of the method, apparatuses, and non-transitory computer-readable medium described herein, measuring the synchronization signal for each base station of the set of base stations may include operations, features, means, or instructions for generating a first synchronization signal measurement for the at least first base station of the set of base stations on a first frequency layer, and generating a second synchronization signal measurement for the second base station of the set of base stations on a second frequency layer that may be different than the first frequency layer.

Some examples of the method, apparatuses, and non-transitory computer-readable medium described herein may further include operations, features, means, or instructions for identifying that the first base station and the second base station may have a quasi co-location (QCL) relationship, and scheduling measurement of the second synchronization signal measurement to occur less frequently than the first synchronization signal measurement based on the QCL relationship.

In some examples of the method, apparatuses, and non-transitory computer-readable medium described herein, measuring the synchronization signal for each base station of the set of base stations may include operations, features, means, or instructions for generating a synchronization signal measurement for each base station of the set of base stations that respectively operate on a different IFREQ layer.

In some examples of the method, apparatuses, and non-transitory computer-readable medium described herein, measuring the synchronization signal for each base station of the set of base stations may include operations, features, means, or instructions for generating a first synchronization signal measurement for the at least first base station of the set of base stations that operates in accordance with a first radio access technology, and generating a second synchronization signal measurement for the second base station of the set of base stations that operates in accordance with a second radio access technology.

In some examples of the method, apparatuses, and non-transitory computer-readable medium described herein, identifying the set of base stations that may be included in the synchronization group may include operations, features, means, or instructions for detecting cell timings of a second set of base stations that respectively operate on a different IFREQ layer of a set of IFREQ layers, identifying a subset of the second set of base stations that each transmit a respective synchronization signal within the measurement timing window based on the cell timings, and classifying the subset of the second set of base stations as being in the synchronization group.

In some examples of the method, apparatuses, and non-transitory computer-readable medium described herein, classifying the subset of the second set of base stations as being in the synchronization group may include operations, features, means, or instructions for identifying a duration of the measurement timing window based on a symbol timing tolerance condition and an intra-band CA tolerance condition, and identifying that the subset of the second set of base stations each transmit a respective synchronization signal within the measurement timing window.

In some examples of the method, apparatuses, and non-transitory computer-readable medium described herein, classifying the subset of the second set of base stations as being in the synchronization group may include operations, features, means, or instructions for identifying a location of the measurement timing window in time based on a timing of a serving base station of the second set of base stations, and identifying that the subset of the second set of base stations each transmit a respective synchronization signal within the measurement timing window based on the location of the measurement timing window.

In some examples of the method, apparatuses, and non-transitory computer-readable medium described herein, measuring the synchronization signal for each base station of the set of base stations may include operations, features, means, or instructions for monitoring a first set of symbol periods within the measurement timing window corresponding to a first synchronization signal block (SSB) for a first synchronization signal transmitted by the at least first base station of the set of base stations, and monitoring a second set of symbol periods within the measurement timing window corresponding to a second synchronization signal block (SSB) for a second synchronization signal transmitted by the second base station of the set of base stations.

Some examples of the method, apparatuses, and non-transitory computer-readable medium described herein may further include operations, features, means, or instructions for identifying a periodicity of the measurement timing window, and generating a subsequent synchronization signal measurement for each base station of the set of base stations based on the periodicity.

In some examples of the method, apparatuses, and non-transitory computer-readable medium described herein, identifying the periodicity may include operations, features, means, or instructions for determining a preconfiguration that indicates the periodicity or receiving control signaling that indicates the periodicity.

Some examples of the method, apparatuses, and non-transitory computer-readable medium described herein may further include operations, features, means, or instructions for receiving control signaling indicating a measurement gap corresponding to the measurement timing window, and scheduling measurement of the set of base stations within the measurement gap.

In some examples of the method, apparatuses, and non-transitory computer-readable medium described herein, identifying the set of base stations that may be included in the synchronization group may include operations, features, means, or instructions for receiving control signaling that indicates that the set of base stations may be included in the synchronization group.

A method of wireless communications by a base station is described. The method may include transmitting, to a UE, an indicator of a set of base stations (e.g., two or more base stations) included in a synchronization group, where at least a first base station of the set of base stations operates on a first frequency that is different than a second frequency on which a second base station of the set of base stations operates, identifying a measurement timing window corresponding to the synchronization group, transmitting, within the measurement timing window, a synchronization signal, and receiving, from the UE, a measurement report that indicates a respective synchronization signal measurement for each of the set of base stations.

An apparatus for wireless communications by a base station is described. The apparatus may include a processor, memory coupled with the processor, and instructions stored in the memory. The instructions may be executable by the processor to cause the apparatus to transmit, to a UE, an indicator of a set of base stations included in a synchronization group, where at least a first base station of the set of base stations operates on a first frequency that is different than a second frequency on which a second base station of the set of base stations operates, identify a measurement timing window corresponding to the synchronization group, transmit, within the measurement timing window, a synchronization signal, and receive, from the UE, a measurement report that indicates a respective synchronization signal measurement for each of the set of base stations.

Another apparatus for wireless communications by a base station is described. The apparatus may include means for transmitting, to a UE, an indicator of a set of base stations included in a synchronization group, where at least a first base station of the set of base stations operates on a first frequency that is different than a second frequency on which a second base station of the set of base stations operates, identifying a measurement timing window corresponding to the synchronization group, transmitting, within the measurement timing window, a synchronization signal, and receiving, from the UE, a measurement report that indicates a respective synchronization signal measurement for each of the set of base stations.

A non-transitory computer-readable medium storing code for wireless communications by a base station is described. The code may include instructions executable by a processor to transmit, to a UE, an indicator of a set of base stations included in a synchronization group, where at least a first base station of the set of base stations operates on a first frequency that is different than a second frequency on which a second base station of the set of base stations operates, identify a measurement timing window corresponding to the synchronization group, transmit, within the measurement timing window, a synchronization signal, and receive, from the UE, a measurement report that indicates a respective synchronization signal measurement for each of the set of base stations.

Some examples of the method, apparatuses, and non-transitory computer-readable medium described herein may further include operations, features, means, or instructions for configuring the UE to cycle between operating in a measurement power state during the measurement timing window and a low power state outside of the measurement timing window.

In some examples of the method, apparatuses, and non-transitory computer-readable medium described herein, identifying the measurement timing window may include operations, features, means, or instructions for identifying a symbol timing tolerance condition for a band and an intra-band CA tolerance condition, and identifying, based on the symbol timing tolerance condition for the band and the intra-band CA tolerance condition, a duration of the measurement timing window.

In some examples of the method, apparatuses, and non-transitory computer-readable medium described herein, identifying the measurement timing window may include operations, features, means, or instructions for identifying a timing of a serving base station, and identifying a location of the measurement timing window in time based on the timing of the serving base station.

Some examples of the method, apparatuses, and non-transitory computer-readable medium described herein may further include operations, features, means, or instructions for configuring the UE with a measurement gap for measuring the set of base stations within the measurement timing window.

In some examples of the method, apparatuses, and non-transitory computer-readable medium described herein, transmitting, within the measurement timing window, the synchronization signal may include operations, features, means, or instructions for transmitting the synchronization signal within a same frequency layer used by an additional base station to transmit a second synchronization signal.

In some examples of the method, apparatuses, and non-transitory computer-readable medium described herein, transmitting, within the measurement timing window, the synchronization signal may include operations, features, means, or instructions for transmitting the synchronization signal within a first frequency layer that may be different than a second frequency layer used by an additional base station to transmit a second synchronization signal.

Some examples of the method, apparatuses, and non-transitory computer-readable medium described herein may further include operations, features, means, or instructions for identifying that the base station and the additional base station may have a QCL relationship, and scheduling the UE to measure a synchronization signal of the additional base station less frequently than the synchronization signal of the base station based on the QCL relationship.

In some examples of the method, apparatuses, and non-transitory computer-readable medium described herein, transmitting the indicator of the set of base stations included in the synchronization group may include operations, features, means, or instructions for detecting cell timings of a second set of base stations that respectively operating on a different IFREQ layer of a set of IFREQ layers, identifying a subset of the second set of base stations that each transmit a synchronization signal within the measurement timing window based on the cell timings, and classifying the subset of the second set of base stations as being in the synchronization group.

In some examples of the method, apparatuses, and non-transitory computer-readable medium described herein, classifying the subset of the second set of base stations as being in the synchronization group may include operations, features, means, or instructions for identifying a symbol timing tolerance condition for a band and an intra-band CA tolerance condition, identifying, based on the symbol timing tolerance condition for the band and the intra-band CA tolerance condition, a duration of the measurement timing window, identifying a location of the measurement timing window in time based on a timing of a serving base station of the second set of base stations, and identifying that the subset of the second set of base stations each transmit the synchronization signal within the measurement timing window.

Some examples of the method, apparatuses, and non-transitory computer-readable medium described herein may further include operations, features, means, or instructions for transmitting control signaling that indicates a periodicity of the measurement timing window.

BRIEF DESCRIPTION OF THE DRAWINGS

FIGS. 3A, 3B, and 3C illustrate examples of measurement timing window configurations that support power savings while performing multiple concurrent cell searches in accordance with aspects of the present disclosure.

DETAILED DESCRIPTION

Figure 1:
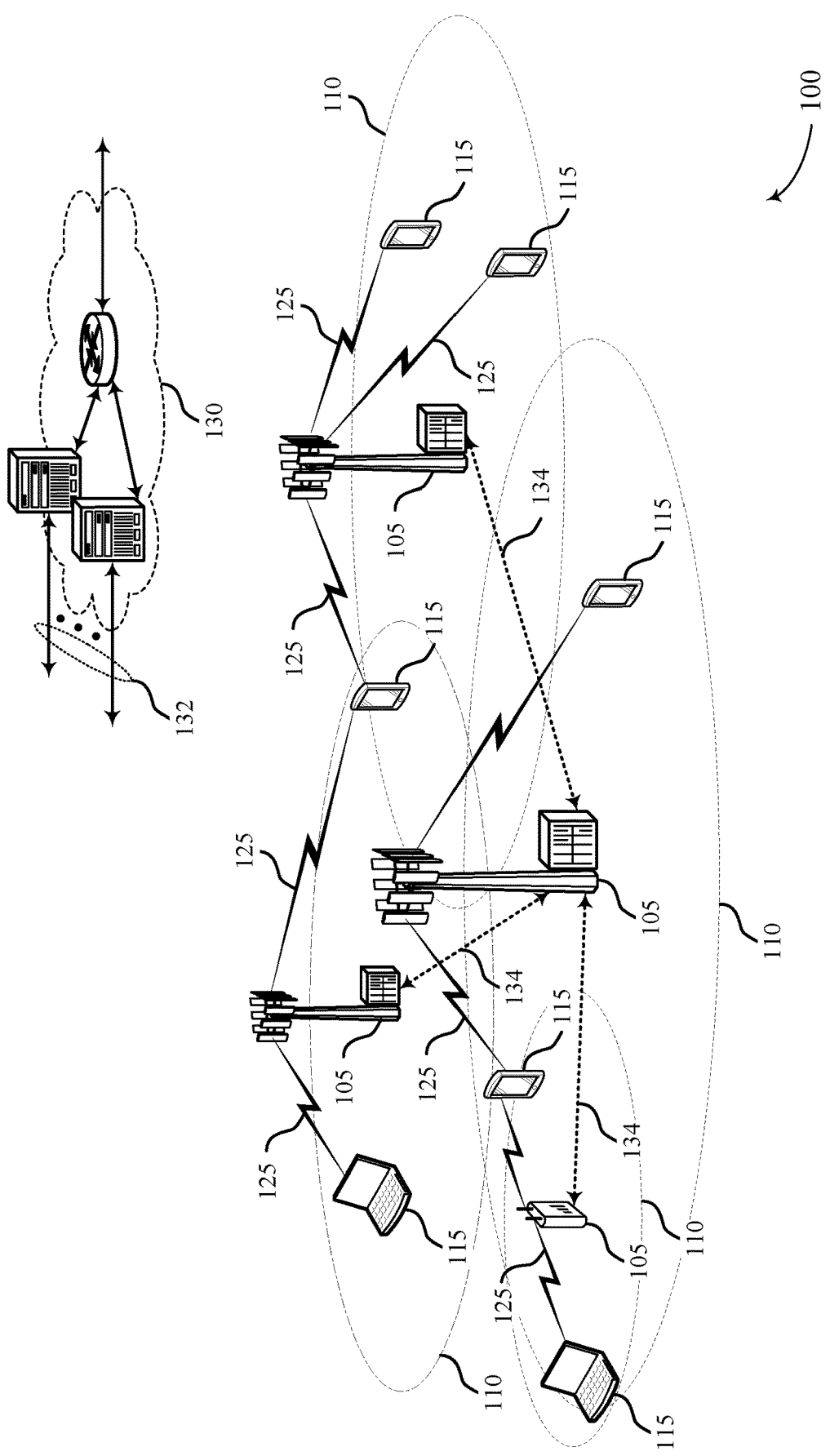
FIG. 1 illustrates an example of a system for wireless communications that supports power savings while performing multiple concurrent cell searches in accordance with aspects of the present disclosure.

In some wireless communications systems, a base station (e.g., or similar network device) may configure a user equipment (UE) to perform searches and measurements on different inter-frequency (IFREQ) layers. For example, a frequency band may consist of multiple frequency layers (e.g., IFREQ layers), and the UE can perform measurements concurrently on multiple frequency layers of the same frequency band. In some cases, the UE may perform measurements on multiple synchronization signals transmitted by multiple base stations on different IFREQ layers. However, one or more synchronization signals may fall outside of a measurement window, resulting in the UE not measuring the synchronization signals or expending unnecessary processing power to search for and measure the synchronization signals outside of the measurement window. As described herein, the UE may identify a set of base stations (e.g., two or more base stations) that are part of a synchronization group. In some cases, the UE may identify the set of base stations based on an indication transmitted by a serving base station to the UE (e.g., where the serving base station is one of the set of base stations that are part of the synchronization group).

Additionally, once the synchronization group is formed/identified, the UE may start to implement a timing transfer for future searches and measurements for synchronization signals from the set of base stations (e.g., the UE attempts to schedule the synchronization signals from the same synchronization group together). For example, after identifying the set of base stations, the UE may identify a measurement timing window associated with the synchronization group and measure a respective synchronization signal for each base station in the set of base stations within the measurement timing window. Accordingly, the UE may then transmit a measurement report to the serving base station that includes the respective synchronization signal measurements. Additionally, receiving and measuring the respective synchronization signals within the measurement timing window may allow the UE to cycle between a measurement power state during the measurement timing window and a low power state (having a power lower than the measurement power state) outside of the measurement timing window, thereby saving power at the UE.

In some cases, the UE (e.g., and the serving base station or additional base stations) may identify the measurement timing window based on identifying a symbol timing tolerance condition for a band, an intra-band carrier aggregation (CA) tolerance condition, and/or a timing of the serving base station, where a duration and location of the measurement timing window may be identified based on the symbol timing tolerance condition for the band, the intra-band CA tolerance condition, the timing of the serving base station, or a combination thereof. Subsequently, when measuring the synchronization signals in the measurement timing window, the UE may generate synchronization signal measurements for each of the base stations in the set of base stations on a same or on different frequency layers.

Aspects of the disclosure are initially described in the context of a wireless communications system. Additionally, aspects of the disclosure are illustrated through an additional wireless communications system, examples of measurement timing window configurations, a frequency search, and a process flow. Aspects of the disclosure are further illustrated by and described with reference to apparatus diagrams, system diagrams, and flowcharts that relate to power savings while performing multiple concurrent cell searches.

FIG. 1 illustrates an example of a wireless communications system 100 that supports power savings while performing multiple concurrent cell searches in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a predefined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems (e.g., 5G, NR, etc.), a base station 105 (e.g., network, serving base station 105, etc.) may configure a UE 115 to perform search and measurement on different IFREQ layers. For example, the search and measurement may assist the UE 115 in transferring from a first cell (e.g., a first base station 105, a cell on the first base station 105, etc.) to a second cell (e.g., a second base station 105, a second cell on the first base station 105, a cell on the second base station 105, etc.). Accordingly, transferring from the first cell to the second cell may include switching from a first frequency of the first cell to a second frequency of the second cell (e.g., from 2 GHz for the first frequency to 2.5 GHz, 3 GHz, etc., for the second frequency), where the search and measurement on the different IFREQ layers may enable the transferring cells and switching frequencies. For example, by measuring the IFREQ layers, the UE 115 may determine channel conditions prior to switching frequencies. Additionally or alternatively, a serving base station 105 for the UE 115 may determine to initiate a handover procedure for the UE 115 to transfer cells and switch frequencies based on the measurements (e.g., reported by the UE 115 to the serving base station 105). In some cases, the transferring from the first cell to the second cell may include a transfer from a first radio access technology (RAT) (e.g., LTE) to a second RAT (e.g., NR), where the UE may perform a search and measurement on different inter-RAT layers.

Additionally, in some cases, the first cell and the second cell (e.g., and additional cells and base stations 105) may be synchronized, where synchronization signals from each cell (e.g., and/or base station 105) may be transmitted within a tolerance limit of symbol timings. If network deployment is synchronized, the synchronization may be indicated to the UE 115 via higher layer signaling (e.g., an RRC information element, such as deriveSSB-IndexFromCell). The synchronization may apply to frequency range 2 (FR2) and to frequency range 1 (FR1) (e.g., TDD FR1). Accordingly, for synchronized networks, different cells on a given frequency layer may have their frame and symbol timings synchronized within a tolerance limit (e.g., symbol timing tolerance) of T1, which may represent a minimum of two (2) synchronization signal (SS)/physical broadcast channel (PBCH) block (SSB) symbols or one symbol of a physical downlink shared channel (PDSCH) (i.e., T1=min(2 SSB symbols, one PDSCH symbol)). Additionally or alternatively, for intra-band CA, different cells on different frequency layers and/or on a same give frequency layer may have their frame and symbol timings synchronized within a tolerance limit (e.g., intra-band CA tolerance) of T2 (e.g., T2=3 µsec).

However, these two tolerance limits (e.g., T1 and T2) may not guarantee that cells on different IFREQs may be synchronized within an acceptable tolerance limit. Additionally, the network may configure IFREQs so that the UE 115 can detect cells to add for potential CA, and, hence, on most IFREQs within a band, cells may be synchronized within a tolerance limit of T1+T2 (e.g., combination of symbol timing tolerance and intra-band CA tolerance). If the UE 115 knows this combined synchronization tolerance limit (e.g., T1+T2), the UE 115 may use timing of a cell detected on one IFREQ to aid detection and measurement of additional cells on other IFREQs from the same band (e.g., using a "timing transfer" technique). The timing transfer may indicate a known (e.g., signaled/indicated) or measured timing relationship between the synchronization signals of a set of base stations 105.

In some wireless communications systems (e.g., mmW systems), many IFREQs may be used for higher order CA. In some cases, 10-12 (e.g., up to 16) measurement gaps may be used to complete one IFREQ (e.g., assuming eight (8) paging occasion (PO) beams with two (2) measurement gaps per PO beam due to saturation). Additionally, if UEs 115 do not support a parallel search/measurement capability, IFREQs may consume many measurement gaps. Accordingly, UEs 115 may support a parallel search/measurement operation to reduce the impact on the measurement gap. When the UE 115 supports concurrent processing on multiple IFREQs (e.g., inside a measurement gap), scheduling IFREQs from a same synchronization group (e.g., a set of cells that are synchronized) together may be beneficial to the UE 115 (e.g., including significant power benefits).

Wireless communications system 100 may support efficient techniques for identifying a set of base stations 105 (e.g., cells) that are part of a synchronization group, where at least two of the base stations in the set of base stations operate on different frequencies. In an example, first, second, and third base stations may operate on the same frequency and are physically separate base stations, and a fourth base station may operate on a different frequency. In some cases, a UE 115 may identify the set of base stations 105 based on an indication transmitted by a serving base station 105 to the UE 115 and/or by building a database based on cell timings on different IFREQs to classify the different IFREQs into respective synchronization groups. Additionally, once a synchronization group is identified, the UE 115 may schedule measurement of synchronization signal transmission from the set of base stations 105 within a particular synchronization group. For example, after identifying the set of base stations, the UE 115 may identify a measurement timing window associated with the synchronization group and measure a respective synchronization signal for each base station 105 within the measurement timing window. Accordingly, the UE 115 may then transmit a measurement report to the serving base station 105 that includes the synchronization signal measurements.

Figure 2:
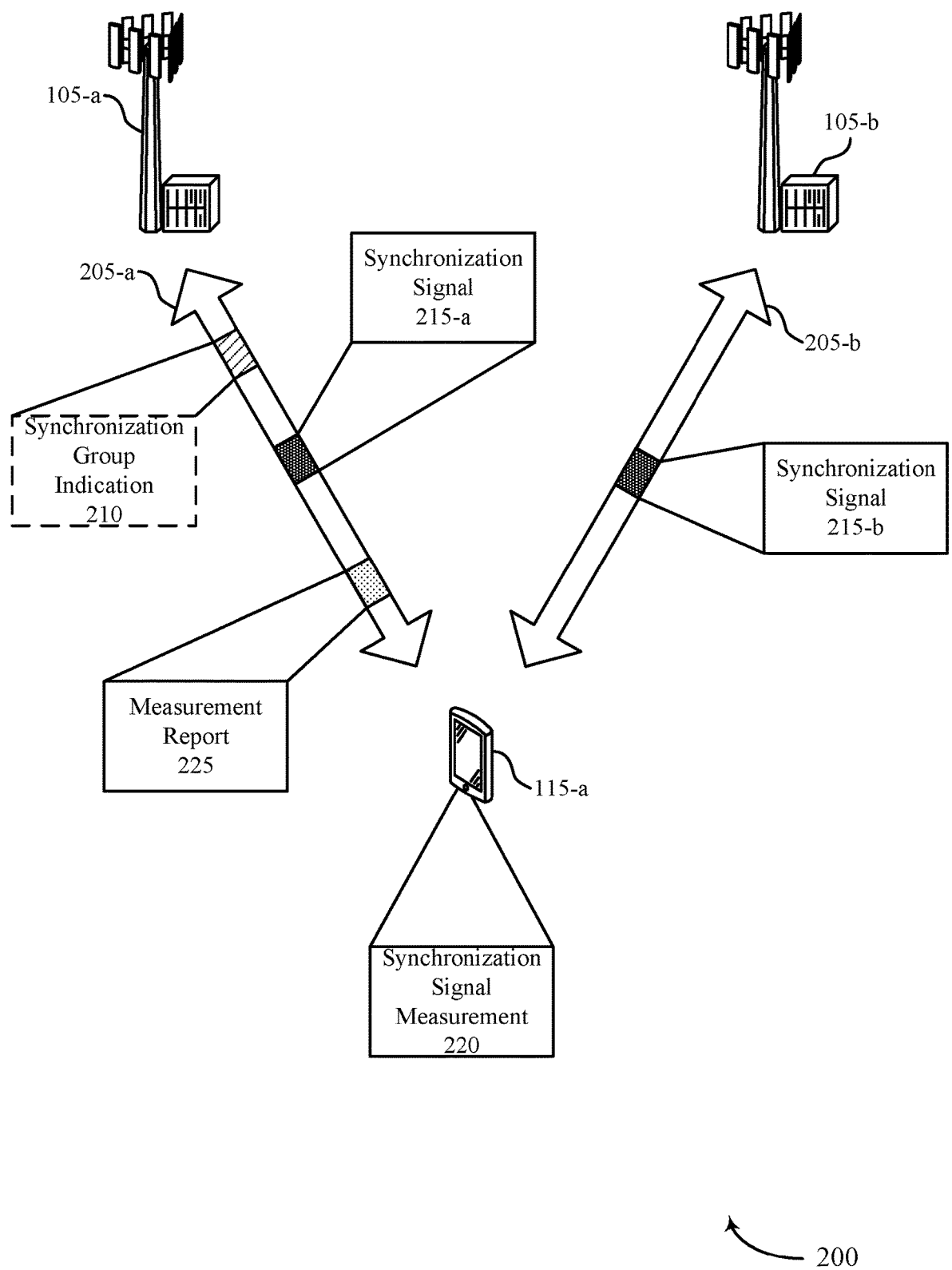
FIG. 2 illustrates an example of a wireless communications system that supports power savings while performing multiple concurrent cell searches in accordance with aspects of the present disclosure.

FIG. 2 illustrates an example of a wireless communication system 200 that supports power savings while performing multiple concurrent cell searches in accordance with aspects of the present disclosure. In some examples, wireless communications system 200 may implement aspects of wireless communications system 100. Wireless communications system 200 may include a base station 105-*a*, a base station 105-*b*, and a UE 115-*a*, which may be examples of corresponding base stations 105 and UEs 115, respectively, as described above with reference to FIG. 1. In some cases, base station 105-*a* may be a serving base station 105 of UE 115-*a* (e.g., UE 115-*a* is currently communicating with base station 105-*a*, receiving configuration information from base station 105-*a*, etc.). For example, base station 105-*a* may configure UE 115-*a* to perform search and measurement (e.g., a parallel search/measurement operation) on different IFREQ layers, which may include searching and measuring signals from at least base station 105-*a* and 105-*b* (e.g., and additional base stations 105 in a set of base stations 105). Accordingly, UE 115-*a* may communicate with base station 105-*a* on resources of a carrier 205-*a* and may receive communications from base station 105-*b* on resources of a carrier 205-*b*.

As described herein, UE 115-*a* may create synchronization groups of base stations 105 (e.g., two or more base stations 105) for searching and measuring on the different IFREQ layers. In some cases, UE 115-*a* may create the synchronization groups based on information from base station 105-*a* (e.g., network assisted information). When configuring monitoring occasions (MOs), base station 105-*a* (e.g., the network) may indicate which IFREQs are synchronized among a set of base stations 105 (e.g., two or more base stations 105) as a synchronization group (e.g., a group). Accordingly, base station 105-*a* may provide this indication as a synchronization group indication 210 to UE 115-*a*, where synchronization group indication 210 may include a timing transfer across IFREQs within a same synchronization group.

Additionally or alternatively, UE 115-*a* may assume no synchronization across IFREQs and may build a database to form a synchronization group of the set of base stations 105 based on receiving a synchronization signal 215 from a base station 105. That is, UE 115-*a* may autonomously form synchronization groups based on search/measurement results for the synchronization signals 215. For example, as shown, base station 105-*a* may transmit (e.g., broadcast, unicast, multicast, etc.) a synchronization signal 215-*a* on carrier 205-*a* to UE 115-*a*, and base station 105-*b* may transmit (e.g., broadcast) a synchronization signal 215-*b* on carrier 205-*b* to UE 115-*a*. Accordingly, as UE 115-*a* detects cells on different IFREQs (e.g., based on receiving the synchronization signals 215), UE 115-*a* may build a database of cell timings on different IFREQs. Subsequently, based on the detected timings, UE 115-*a* may classify IFREQs into different synchronization groups. Moreover, as it gets secondary component carriers (SCCs) added (e.g., for CA), UE 115-*a* may identify network deployment and may consider all CA frequencies as one synchronization group.

Once the synchronization groups are identified/formed, UE 115-*a* may start to do timing transfer for a synchronization signal measurement 220 (e.g., future IFREQ search and measurements). In some cases, UE 115-*a* may perform synchronization signal measurement 220 within a measurement gap (e.g., a measurement timing window) configured for UE 115-*a* to measure signals from a base station 105. For example, UE 115-*a* may attempt to schedule measurement of a set of (e.g., all) IFREQs from a same synchronization group together (e.g., within a same measurement timing window). By scheduling the IFREQ measurements together, UE 115-*a* may employ power features more aggressively. For example, when IFREQs from the same synchronization group are scheduled together, UE 115-*a* may find certain portions of a measurement gap where UE 115-*a* expects to receive synchronization signals 215 (e.g., SSBs) and may remain awake during those certain portions and may sleep (e.g., a low power state) everywhere else in the measurement gap (e.g., thereby saving power). Additionally or alternatively, if IFREQs from different synchronization groups are scheduled together, synchronization signals 215 (e.g., SSBs) may fall at various positions across the measurement gap, such that power saving schemes may not be used as aggressively. For example, UE 115-*a* may not identify or schedule common portions of the measurement gap when synchronization signals 215 will be arriving and, as such, may not be able to enter sleep states based on the variable nature of when the synchronization signals 215 can arrive.

In some cases, UE 115-*a* may employ subsampling across the IFREQs. For example, once UE 115-*a* identifies potential CA frequencies, UE 115-*a* may assume that base stations 105 (e.g., cells) operating on those frequencies are quasi co-located (QCLed) (e.g., in CA, different CCs may be QCLed). Therefore, UE 115-*a* may search/measure some of the IFREQs from a same synchronization group with lower priority (e.g., increasing power savings further). For example, the UE 115-*a* may measure a lower priority IFREQ less often than a higher priority IFREQ.

Additionally, if IFREQs from the same synchronization group are scheduled together, UE 115-*a* may employ additional power saving features. Since SSB locations (e.g., time-frequency resources for base stations 105 to transmit synchronization signals 215) across these IFREQs may be aligned in a measurement gap, UE 115-*a* may power collapse (e.g., enter a sleep state, low power state, etc.) in portions of the measurement gap that do not contain SSBs. Some techniques may include using zero element beams (ZEBs) on the portions that do not contain any SSBs. In some cases, ZEBs may yield higher power savings than other techniques (e.g., upwards of 20% power savings relative to a connected discontinuous reception (CDRX) case). Additionally, UE 115-*a* may use further power savings features other than using ZEBs for power saving schemes.

In some cases, if IFREQs from different synchronization groups are scheduled together, UE 115-*a* may be unable to use the power saving features described above. For example, SSBs across IFREQs may not be aligned for the different synchronization groups, and UE 115-*a* may be unable to find a common duration for the power collapse state, affecting the power usage of UE 115-*a*. Additionally or alternatively, UE 115-*a* may use sub sampling across IFREQs to save power as some IFREQs can be measured less frequently than other IFREQs (e.g., based on a quasi co-location (QCL) relationship between base stations 105/cells).

After performing synchronization signal measurement 220 (e.g., search/measurement operation), UE 115-*a* may transmit a measurement report 225 to base station 105-*a* (e.g., the serving base station 105) that includes measurements for synchronization signals 215 from corresponding base stations 105. In some cases, based on the measurements in measurement report 225, base station 105-*a* may determine to transfer UE 115-*a* to a different base station 105. For example, the measurements of synchronization signal 215-*b* may indicate that base station 105-*b* has a better connection with UE 115-*a*, and base station 105-*a* may handover communications with UE 115-*a* to base station 105-*b*. Additionally or alternatively, UE 115-*a* may move from a coverage area associated with base station 105-*a* to a coverage area associated with base station 105-*b*, and base station 105-*a* may use the measurements in measurement report 225 to perform a handover to base station 105-*b*. Accordingly, measurement report 225 may include measurements for different IFREQ layers to facilitate movement of UE 115-*a* from cell to cell (e.g., from base station to base station, from RAT to RAT, etc.).

FIGS. 3A, 3B, and 3C illustrate examples of measurement timing window configurations 300, 301, and 302, respectively, that support power savings while performing multiple concurrent cell searches in accordance with aspects of the present disclosure. In some examples, measurement timing window configurations 300, 301, and 302 may implement aspects of wireless communications systems 100 and/or 200. A UE 115 may identify and use measurement timing window configurations 300, 301, and 302 for receiving synchronization signals (e.g., in SSBs) from one or more base stations 105. Additionally or alternatively, the one or more base stations 105 may identify and use the measurement timing window configurations 300, 301, and 302 for transmitting the synchronization signals (e.g., to the UE 115, broadcasted out, etc.).

Each measurement timing window configuration 300, 301, and 302 may be centered and located around a serving base station timing 305. However, each measurement timing window configuration 300, 301, and 302 may include a variable number of frequency layers 310 that affect a size of a corresponding measurement timing window 315. In some cases, a frequency band may consist of multiple frequency layers 315 (e.g., IFREQ layers, CA frequencies, non-CA frequencies, etc.), and the UE 115 may perform measurements concurrently on multiple frequency layers 315 of the same frequency band. Measurement timing window configuration 300 may include a single frequency layer 310-*a* for measurement timing window 315-*a*, where frame and symbol timings are synchronized within a tolerance limit of T1 (e.g., before and after the serving base station timing 305) for each base station 105 in a same synchronization group. For example, T1 may represent a minimum of two (2) SSB symbols or one symbol of a PDSCH (i.e., T1=min(2 SSB symbols, one PDSCH symbol)). Additionally, T1 may be referred to as a symbol timing tolerance condition) Accordingly, the UE 115 may perform a synchronization signal measurement 320-*a* within measurement timing window 315-*a*.

Additionally or alternatively, measurement timing window configuration 301 may include frequency layer 310-*a*, a second frequency layer 310-*b*, and a third frequency layer 310-*c*. for measurement timing window 315-*b*. In some cases, measurement timing window 315-*b* may be configured for a synchronization group of base stations 105 (e.g., two or more base stations 105) that use frequency layers 310-*a* and 310-*b*. For example, frequency layers 310-*a* and 310-*b* may be used for an intra-band CA, where cells of the intra-band CA are within a tolerance limit of T2 (e.g., an intra-band CA tolerance condition). In some cases, T2 may be equal to three (3) microseconds (e.g., before and after the serving base station timing 305). Accordingly, the UE 115 may perform a synchronization signal measurement 320-*b* within measurement timing window 315-*b*. However, in some cases, third frequency layer 310-*c* may be used for a non-CA frequency, such that a synchronization signal measurement 320-*c* occurs outside of measurement timing window 315-*b*. As such, the UE 115 may refrain from performing the synchronization signal measurement 320-*c* or may be unable to use power saving features based on not being able to enter a sleep state after measurement timing window 315-*b* ends.

As described herein, for measurement timing window configuration 302 that includes frequency layer 310-*a* and 310-*b* (e.g., for potential CA). In some cases, measurement timing window 315-*c* may be configured for a synchronization group of base stations 105 that use frequency layers 310-*a* and 310-*b*. Additionally, a serving base station 105 (e.g., network) may configure IFREQs so that the UE 115 detects cells to add for potential CA, and, hence, on most IFREQs within a band, base stations 105 (e.g., cells) may be synchronized within a tolerance limit of T1+T2 (e.g., combination of symbol timing tolerance condition and intra-band CA tolerance condition). Accordingly, the UE 115 may perform a synchronization signal measurement 320-*d* and a synchronization signal measurement 320-*e* within measurement timing window 315-*c*. As such, the UE 115 may expect to find synchronization signals during measurement timing window 315-*c* and remain awake during the corresponding duration. Additionally, the UE 115 may enter a sleep duration 325 outside of measurement timing window 315-*c*, where the UE 115 enters a low power state based on not expecting to find synchronization signals during sleep duration 325.

Figure 4:
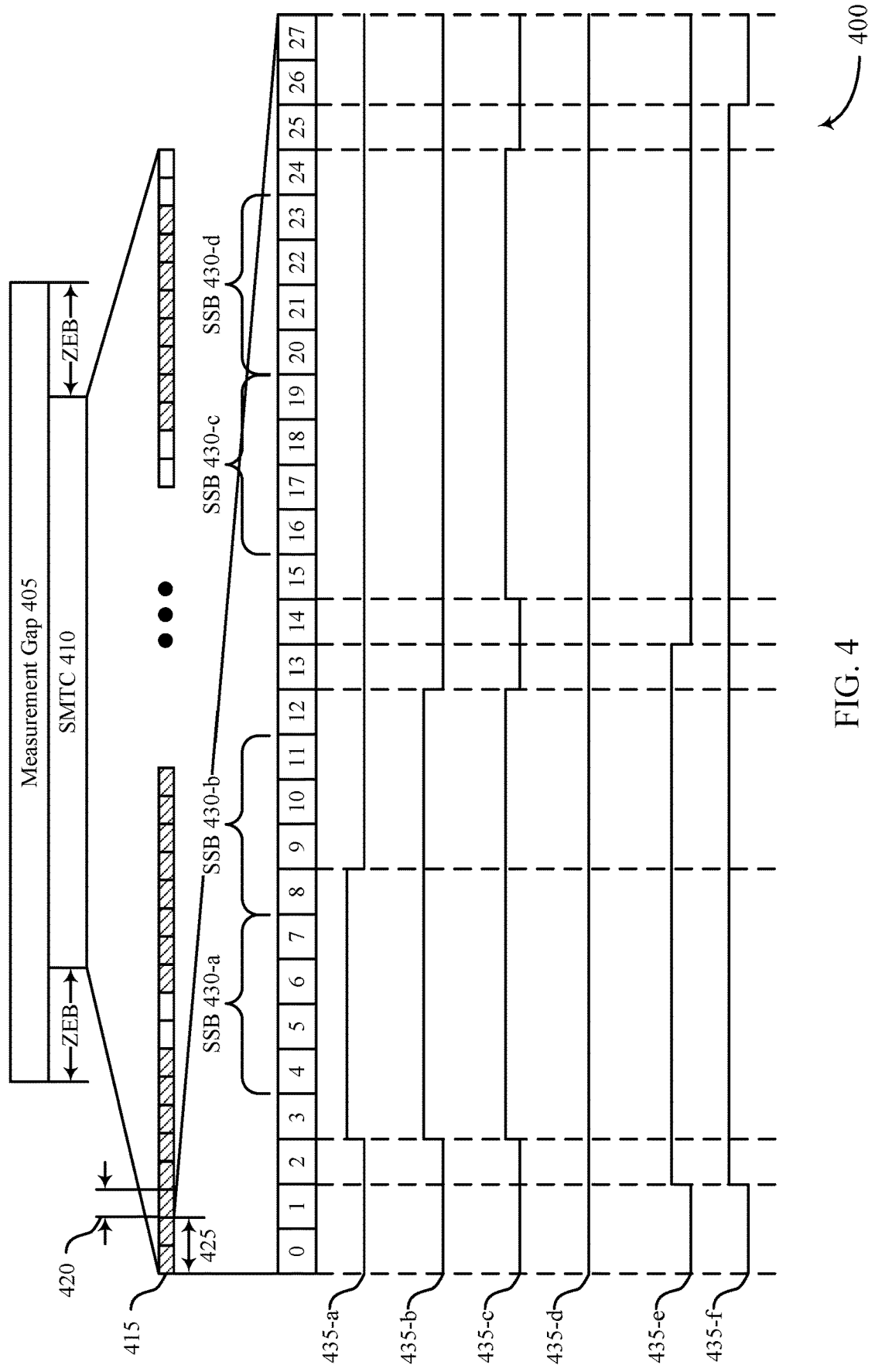
FIG. 4 illustrates an example of a frequency search that supports power savings while performing multiple concurrent cell searches in accordance with aspects of the present disclosure.

FIG. 4 illustrates an example of a frequency search 400 that supports power savings while performing multiple concurrent cell searches in accordance with aspects of the present disclosure. In some examples, frequency search 400 may implement aspects of wireless communications systems 100 and/or 200. A UE 115 may use frequency search 400 to search and measure synchronization signals from one or more base stations 105, where the one or more base stations 105 are part of a synchronization group.

Frequency search 400 may include a measurement gap 405 (e.g., measurement timing window) that includes an SSB measurement time configuration (SMTC) 410. For example, the UE 115 may use one active beam inside measurement gap 405 and SMTC 410 along with ZEBs (e.g., ZEBs before and after SMTC 410 in measurement gap 405). Additionally, SMTC 410 may include multiple slots 415 (e.g., or different length TTIs). Each slot 415 may include a duration 420 (e.g., 0.125 ms, 14 OFDM symbols for a 120 kHz subcarrier spacing, etc.). Additionally, a duration 425 may include two slots 415 (e.g., 0.25 ms, 28 OFDM symbols numbered from 0 to 27, etc.). The UE 115 may perform a search and measurement for synchronization signals from one or more base stations 105 during the duration 425. In some cases, one or more SSBs 430 may be included in the duration 425. For example, as shown, the duration 425 may include a first SSB 430-*a* (e.g., SSB0), a second SSB 430-*b* (e.g., SSB1), a third SSB 430-*c* (e.g., SSB2), and a fourth SSB 430-*d* (e.g., SSB3). Accordingly, the one or more base stations 105 may use the SSBs 430 to transmit synchronization signals to the UE 115 (e.g., and/or broadcasted out). In some cases, on symbols carrying an SSB 430 and one symbol to the left/right of the SSB 430, the UE 115 may use an active beam to search for and measure any synchronization signals. Additionally or alternatively, for the rest of the symbols of the duration 425, the UE 115 may use a ZEB.

Accordingly, the UE 115 may perform different measurements 435 to search for and measure synchronization signals from the one or more base stations. In some cases, measurements 435-*a*, 435-*b*, 435-*c*, and 435-*d* may represent single frequency layer cases (e.g., with a tolerance limit of the symbol timing tolerance condition (T1), such as one (1) symbol). For example, measurement 435-*a* may include the UE 115 searching over SSB 430-*a* (e.g., including one symbol before and after SSB 430-*a*), measurement 435-*b* may include the UE 115 searching over SSB 430-*a* and SSB 430-*b* (e.g., including one symbol before SSB 430-*a* and one symbol after SSB 430-*b*), measurement 435-*c* may include the UE 115 searching over each SSB 430 (e.g., including one symbol before and after each SSB 430), and measurement 435-*d* may include the UE 115 not searching any of the SSBs 430.

Additionally or alternatively, measurements 435-*e* and 435-*f* may include multiple frequency layers from a same synchronization group (e.g., with a tolerance limit of a combination of a symbol timing tolerance condition and an intra-band CA tolerance condition (T1+T2), such as two (2) symbols). For example, measurement 435-*e* may include the UE 115 searching over SSB 430-*a* and SSB 430-*b* (e.g., including the two symbols before SSB 430-*a* and the two symbols after SSB 430-*b*), and measurement 435-*f* may include the UE 115 searching over all SSBs 430 (e.g., including the two symbols before and after each SSB 430).

Figure 5:
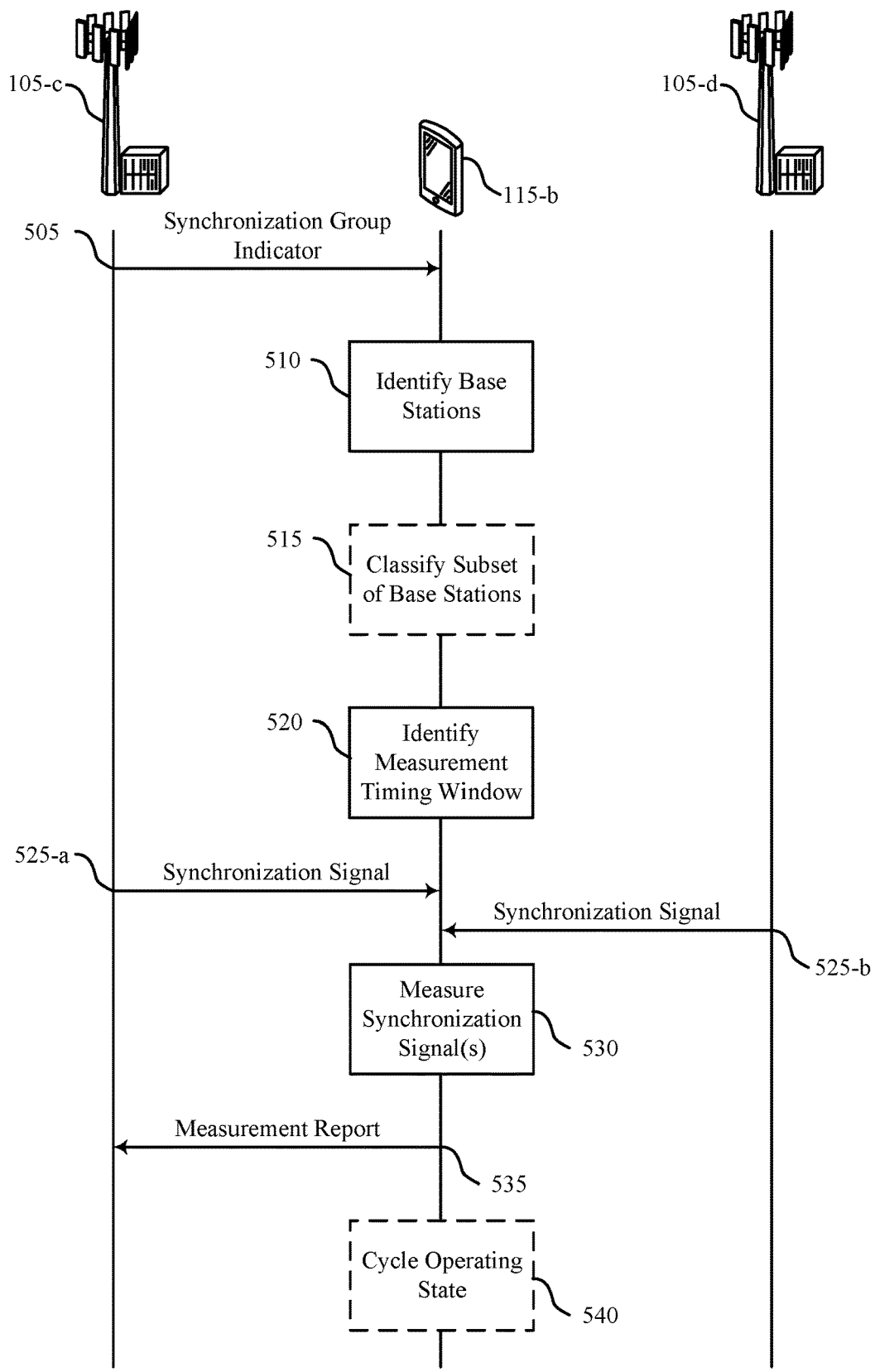
FIG. 5 illustrates an example of a process flow that supports power savings while performing multiple concurrent cell searches in accordance with aspects of the present disclosure.

FIG. 5 illustrates an example of a process flow 500 that supports power savings while performing multiple concurrent cell searches in accordance with aspects of the present disclosure. In some examples, process flow 500 may implement aspects of wireless communications systems 100 and/or 200. Process flow 500 may include a base station 105-*c*, a base station 105-*d*, and a UE 115-*b*, which may be examples of corresponding base stations 105 and UEs 115, respectively, as described above with reference to FIGS. 1-4.

In the following description of the process flow 500, the operations between UE 115-*b*, base station 105-*c*, and base station 105-*d* may be transmitted in a different order than the order shown, or the operations performed by base station 105-*c*, base station 105-*d*, and UE 115-*b* may be performed in different orders or at different times. Certain operations may also be left out of the process flow 500, or other operations may be added to the process flow 500. It is to be understood that while base station 105-*c*, base station 105-*d*, and UE 115-*b* are shown performing a number of the operations of process flow 500, any wireless device may perform the operations shown.

At 505, base station 105-*c* (e.g., or any base station 105 within a set of base stations 105) may transmit an indicator of a set of base stations 105 (e.g., two or more base stations 105) included in a synchronization group, where at least a first base station 105 of the set of base stations 105 operates on a first frequency that is different than a second frequency on which a second base station 105 of the set of base stations 105 operates. In some examples, UE 115-*b* instead may independently determine a set of base stations 105 (e.g., two or more base stations 105) that are included in the synchronization group, with or without receiving the indicator.

At 510, UE 115-*b* may identify the set of base stations 105 that are included in a synchronization group, where at least a first base station 105 (e.g., base station 105-*c*) of the set of base stations 105 operates on a first frequency that is different than a second frequency on which a second base station 105 (e.g., base station 105-*d*) of the set of base stations 105 operates. In some cases, UE 115-*b* may detect cell timings of a second set of base stations 105 (e.g., two or more base stations 105) that respectively operate on a different IFREQ layer of a set of IFREQ layers (e.g., two or more IFREQ layers) and may identify a subset of the second set of base stations 105 that each transmit a respective synchronization signal within the measurement timing window based on the cell timings. The identified subset may be the set of base stations 105 that are included in a synchronization group. Additionally or alternatively, UE 115-*b* may identify the set of base stations 105 that are included in the synchronization group based on receiving control signaling (e.g., the indicator received from base station 105-*c* at 505) that indicates that the set of base stations 105 are included in the synchronization group.

At 515, UE 115-*b* may classify the subset of the second set of base stations 105 as being in the synchronization group. In some cases, UE 115-*b* may identify a duration of the measurement timing window based on a symbol timing tolerance condition (e.g., T1 as described above, where T1=min(2 SSB symbols, one PDSCH symbol) and an intra-band CA tolerance condition (e.g., T2 as described above, where T2=3 µs, or a combination of T1 and T2 (T1+T2)) and may identify that the subset of the second set of base stations 105 each transmit a respective synchronization signal within the measurement timing window. Additionally or alternatively, UE 115-*b* may identify a location of the measurement timing window in time based on a timing of a serving base station 105 of the second set of base stations 105 and may identify that the subset of the second set of base stations 105 each transmit a respective synchronization signal within the measurement timing window based on the location of the measurement timing window. In some cases, base station 105-*c* (e.g., or an additional base station 105 of the set of base stations 105) may perform the subset classification as described above.

At 520, UE 115-*b* may identify a measurement timing window corresponding to the synchronization group. In some cases, UE 115-*b* may identify a symbol timing tolerance condition for a band and an intra-band CA tolerance condition (e.g., T1, T2, T1+T2, etc.) and may identify a duration of the measurement timing window based on the symbol timing tolerance condition for the band and the intra-band CA tolerance condition. Additionally or alternatively, UE 115-*b* may identify a timing of a serving base station 105 (e.g., base station 105-*c*) and may identify a location of the measurement timing window in time based on the timing of the serving base station 105. In some cases, base station 105-*c* (e.g., or an additional base station 105 of the set of base stations 105) may perform the measurement timing window identification as described above.

At 525, one or more base stations 105 may transmit, within the measurement timing window, a synchronization signal. For example, at 525-*a*, base station 105-*c* may transmit a first synchronization signal to UE 115-*b*. Subsequently, at 525-*b*, base station 105-*d* may transmit a second synchronization signal to UE 115-*b*, where the second synchronization signal is transmitted at a later time than the first synchronization signal but is still located within the measurement timing window. Additionally or alternatively, the second synchronization signal may be transmitted at an earlier time than the first synchronization signal but is still located within the measurement timing window. In some cases, when transmitting the synchronization signal, a serving base station 105 may transmit the synchronization signal within a same frequency layer used by an additional base station 105 to transmit a second synchronization signal. Additionally or alternatively, the serving base station 105 may transmit the synchronization signal within a first frequency layer that is different than a second frequency layer used by an additional base station 105 to transmit a second synchronization signal. Subsequently, in some cases, the serving base station 105 may identify that the serving base station 105 and the additional base station 105 have a quasi co-location relationship (e.g., QCL relationship) and may schedule UE 115-*b* to measure a synchronization signal of the additional base station 105 less frequently than the synchronization signal of the serving base station 105 based on the quasi co-location relationship.

In some cases, UE 115-*b* may identify a periodicity of the measurement timing window and may generate a subsequent synchronization signal measurement for each base station 105 of the set of base stations 105 based on the periodicity. For example, base station 105-*c* (e.g., or an additional base station 105 of the set of base stations 105) may transmit control signaling that indicates the periodicity of the measurement timing window. Additionally or alternatively, UE 115-*b* may determine a preconfiguration that indicates the periodicity or may receive control signaling that indicates the periodicity. In some cases, UE 115-*b* may receive control signaling indicating a measurement gap corresponding to the measurement timing window and may schedule measurement of the set of base stations within the measurement gap. For example, base station 105-*c* may configure UE 115-*b* with the measurement gap for measuring the set of base stations 105 within the measurement timing window.

At 530, UE 115-*b* may measure, within the measurement timing window, a respective synchronization signal for each base station of the set of base stations. In some cases, UE 115-*b* may generate a synchronization signal measurement for each base station of the set of base stations on a same frequency layer. Additionally or alternatively, UE 115-*b* may generate a first synchronization signal measurement for the at least first base station 105 of the set of base stations 105 on a first frequency layer and may generate a second synchronization signal measurement for the second base station 105 of the set of base stations 105 on a second frequency layer that is different than the first frequency layer. Subsequently, in some cases, UE 115-*b* may identify that the first base station 105 and the second base station 105 have a quasi co-location (e.g., QCL) relationship and may schedule measurement of the second synchronization signal measurement to occur less frequently than the first synchronization signal measurement based on the quasi co-location relationship.

In some cases, UE 115-*b* may generate a synchronization signal measurement for each base station 105 of the set of base stations 105 that respectively operate on a different inter-frequency (e.g., IFREQ) layer. Additionally or alternatively, UE 115-*b* may generate a first synchronization signal measurement for the at least first base station 105 of the set of base stations 105 that operates in accordance with a first RAT (e.g., NR) and may generate a second synchronization signal measurement for the second base station 105 of the set of base stations 105 that operates in accordance with a second RAT (e.g., LTE). In some cases, UE 115-*b* may monitor a first set of symbol periods within the measurement timing window corresponding to a first synchronization signal block (e.g., first SSB) for a first synchronization signal transmitted by the at least first base station 105 of the set of base stations 105 and may monitor a second set of symbol periods within the measurement timing window corresponding to a second synchronization signal block (e.g., second SSB) for a second synchronization signal transmitted by the second base station 105 of the set of base stations 105.

At 535, UE 115-*b* may transmit (e.g., to base station 105-*c*) a measurement report that indicates a set of synchronization signal measurements (e.g., two or more synchronization signal measurements corresponding to the respective synchronization signal for each base station of the set of base stations 105). In some cases, the measurement report may indicate a respective synchronization signal measurement for each of the set of base stations 105.

At 540, UE 115-*b* may cycle between operating in a measurement power state during the measurement timing window and a lower power state outside of the measurement timing window. In some cases, base station 105-*c* may configure UE 115-*b* to cycle between operating in the measurement power state during the measurement timing window and the low power state outside of the measurement timing window.

Figure 6:
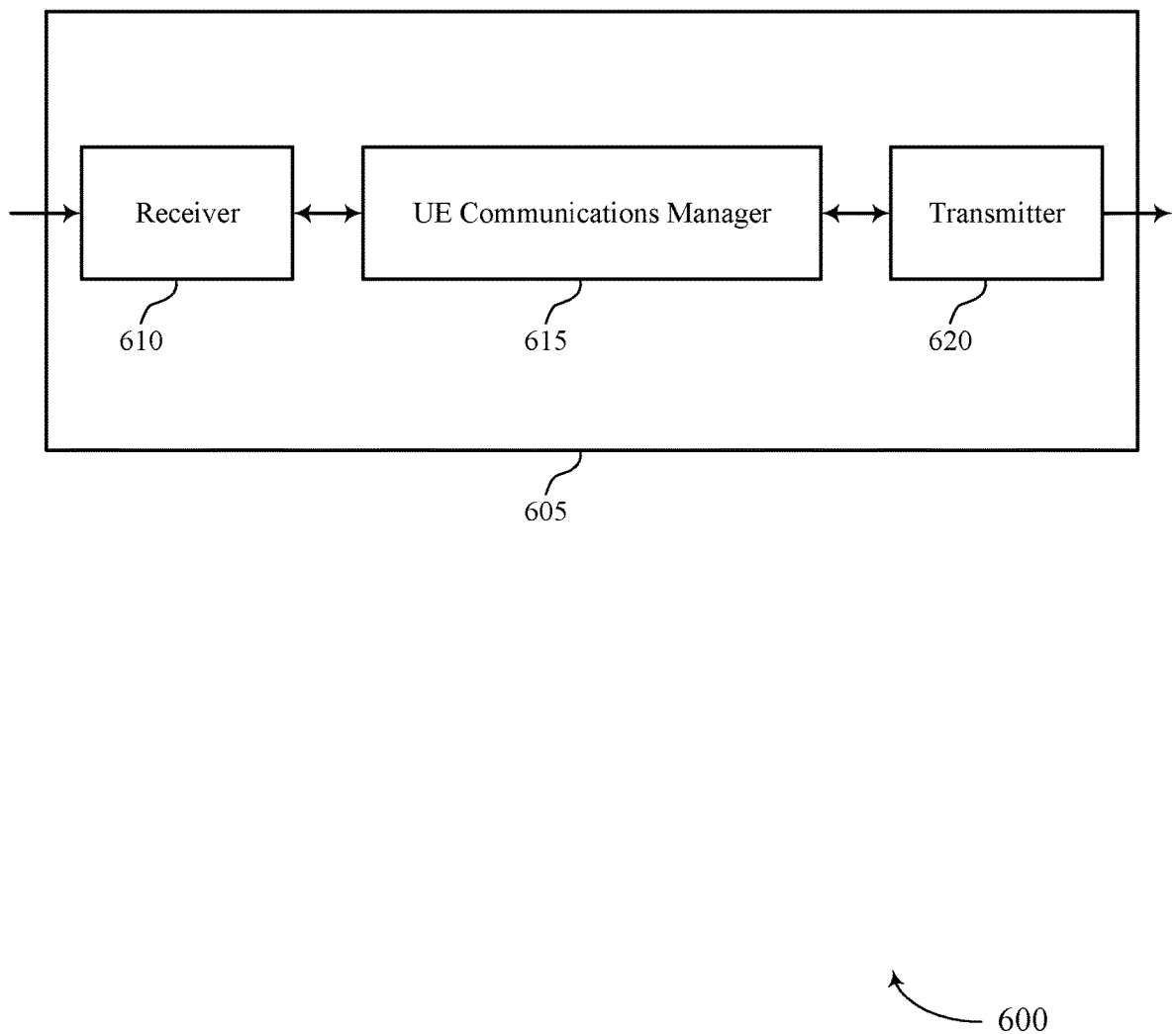
FIGS. 6 and 7 show block diagrams of devices that support power savings while performing multiple concurrent cell searches in accordance with aspects of the present disclosure.

FIG. 6 shows a block diagram 600 of a device 605 that supports power savings while performing multiple concurrent cell searches in accordance with aspects of the present disclosure. The device 605 may be an example of aspects of a UE 115 as described herein. The device 605 may include a receiver 610, a UE communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to power savings while performing multiple concurrent cell searches, etc.). Information may be passed on to other components of the device 605. The receiver 610 may be an example of aspects of the transceiver 920 described with reference to FIG. 9. The receiver 610 may utilize a single antenna or a set of antennas.

The UE communications manager 615 may identify a set of base stations (e.g., two or more base stations) that are included in a synchronization group, where at least a first base station of the set of base stations operates on a first frequency that is different than a second frequency on which a second base station of the set of base stations operates. Additionally, the UE communications manager 615 may identify a measurement timing window corresponding to the synchronization group. In some cases, the UE communications manager 615 may measure, within the measurement timing window, a respective synchronization signal for each base station of the set of base stations. Subsequently, the UE communications manager 615 may transmit a measurement report that indicates a set of synchronization signal measurements (e.g., two or more synchronization signal measurements for the respective synchronization signal for each base station of the set of base stations). The UE communications manager 615 may be an example of aspects of the UE communications manager 910 described herein.

The UE communications manager 615, or its sub-components, may be implemented in hardware, code (e.g., software or firmware) executed by a processor, or any combination thereof. If implemented in code executed by a processor, the functions of the UE communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 615, or its sub-components, may be physically located at various positions, including being distributed such that portions of functions are implemented at different physical locations by one or more physical components. In some examples, the UE communications manager 615, or its sub-components, may be a separate and distinct component in accordance with various aspects of the present disclosure. In some examples, the UE communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
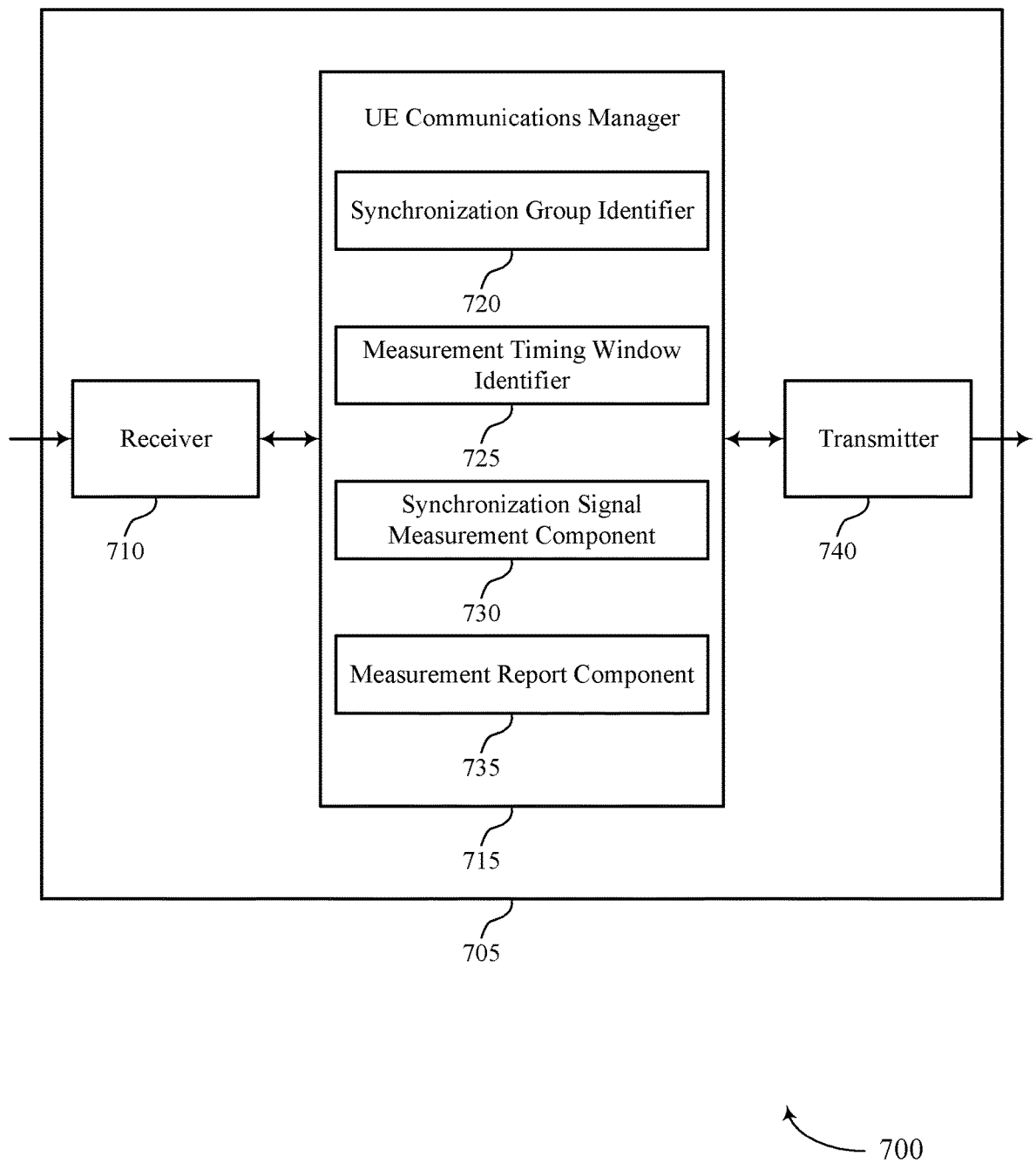

FIG. 7 shows a block diagram 700 of a device 705 that supports power savings while performing multiple concurrent cell searches in accordance with aspects of the present disclosure. The device 705 may be an example of aspects of a device 605, or a UE 115 as described herein. The device 705 may include a receiver 710, a UE communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to power savings while performing multiple concurrent cell searches, etc.). Information may be passed on to other components of the device 705. The receiver 710 may be an example of aspects of the transceiver 920 described with reference to FIG. 9. The receiver 710 may utilize a single antenna or a set of antennas.

The UE communications manager 715 may be an example of aspects of the UE communications manager 615 as described herein. The UE communications manager 715 may include a synchronization group identifier 720, a measurement timing window identifier 725, a synchronization signal measurement component 730, and a measurement report component 735. The UE communications manager 715 may be an example of aspects of the UE communications manager 910 described herein.

The synchronization group identifier 720 may identify a set of base stations (e.g., two or more base stations) that are included in a synchronization group, where at least a first base station of the set of base stations operates on a first frequency that is different than a second frequency on which a second base station of the set of base stations operates.

The measurement timing window identifier 725 may identify a measurement timing window corresponding to the synchronization group.

The synchronization signal measurement component 730 may measure, within the measurement timing window, a respective synchronization signal for each base station of the set of base stations.

The measurement report component 735 may transmit a measurement report that indicates a set of synchronization signal measurements (e.g., two or more synchronization signal measurements).

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
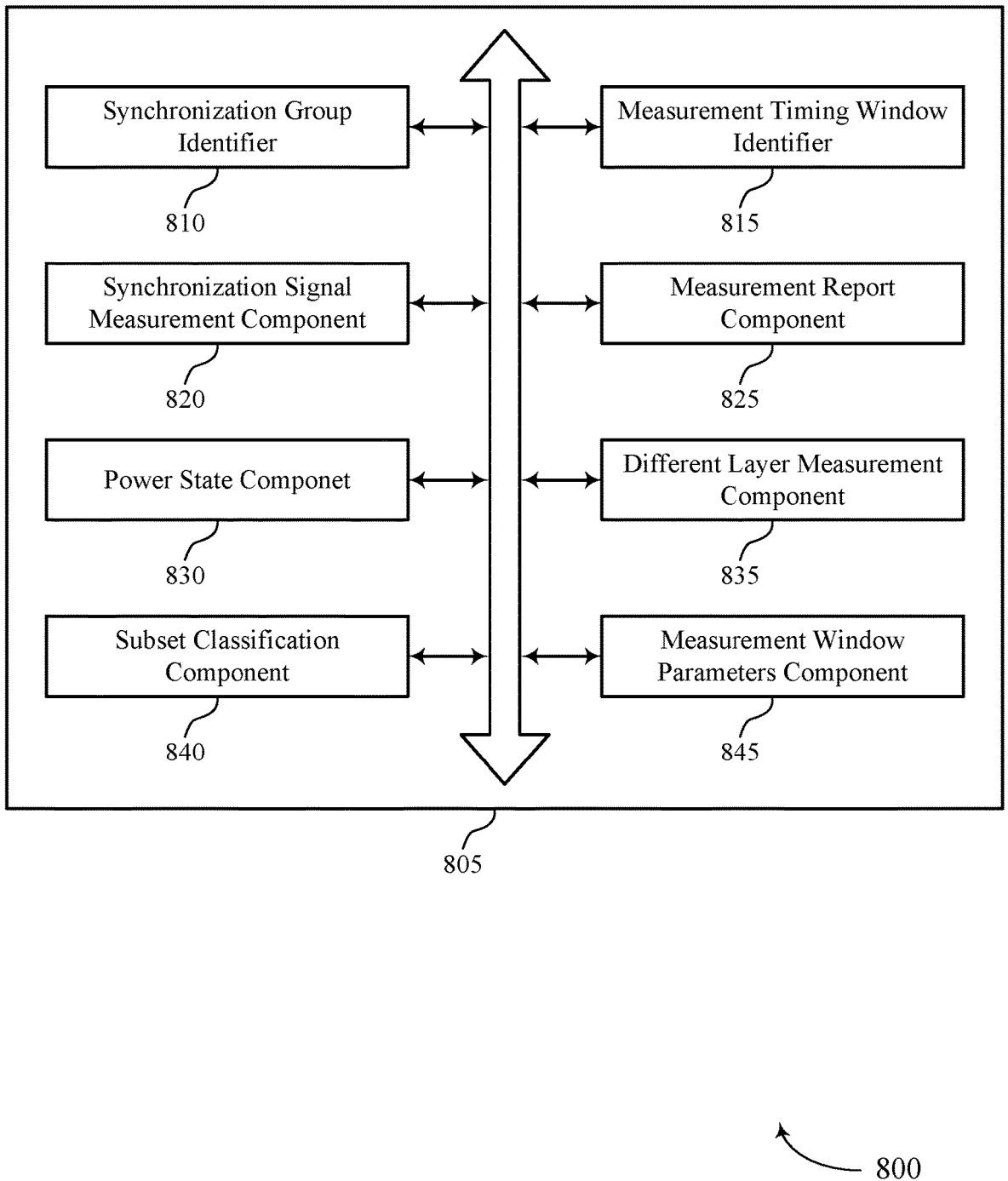
FIG. 8 shows a block diagram of a UE communications manager that supports power savings while performing multiple concurrent cell searches in accordance with aspects of the present disclosure.

FIG. 8 shows a block diagram 800 of a UE communications manager 805 that supports power savings while performing multiple concurrent cell searches in accordance with aspects of the present disclosure. The UE communications manager 805 may be an example of aspects of a UE communications manager 615, a UE communications manager 715, or a UE communications manager 910 described herein. The UE communications manager 805 may include a synchronization group identifier 810, a measurement timing window identifier 815, a synchronization signal measurement component 820, a measurement report component 825, a power state component 830, a different layer measurement component 835, a subset classification component 840, and a measurement window parameters component 845. Each of these modules may communicate, directly or indirectly, with one another (e.g., via one or more buses).

The synchronization group identifier 810 may identify a set of base stations (e.g., two or more base stations) that are included in a synchronization group, where at least a first base station of the set of base stations operates on a first frequency that is different than a second frequency on which a second base station of the set of base stations operates. In some examples, the synchronization group identifier 810 may receive control signaling that indicates that the set of base stations are included in the synchronization group.

The measurement timing window identifier 815 may identify a measurement timing window corresponding to the synchronization group. In some examples, the measurement timing window identifier 815 may identify a symbol timing tolerance condition for a band and an intra-band carrier aggregation tolerance condition (e.g., T1, T2, T1+T2, etc., as described above) and may identify a duration of the measurement timing window based on the symbol timing tolerance condition for the band and the intra-band carrier aggregation tolerance condition. Additionally or alternatively, the measurement timing window identifier 815 may identify a timing of a serving base station and may identify a location of the measurement timing window in time based on the timing of the serving base station.

The synchronization signal measurement component 820 may measure, within the measurement timing window, a respective synchronization signal for each base station of the set of base stations. In some examples, the synchronization signal measurement component 820 may generate a synchronization signal measurement for each base station of the set of base stations on a same frequency layer. Additionally or alternatively, the synchronization signal measurement component 820 may generate a first synchronization signal measurement for the at least first base station of the set of base stations that operates in accordance with a first RAT and may generate a second synchronization signal measurement for the second base station of the set of base stations that operates in accordance with a second RAT. In some examples, the synchronization signal measurement component 820 may monitor a first set of symbol periods within the measurement timing window corresponding to a first synchronization signal block (e.g., SSB) for a first synchronization signal transmitted by the at least first base station of the set of base stations and may monitor a second set of symbol periods within the measurement timing window corresponding to a second synchronization signal block (e.g., SSB) for a second synchronization signal transmitted by the second base station of the set of base stations.

The measurement report component 825 may transmit a measurement report that indicates a set of synchronization signal measurements (e.g., two or more synchronization signal measurements for the respective synchronization signal for each base station of the set of base stations).

The power state component 830 may cycle between operating in a measurement power state during the measurement timing window and a lower power state outside of the measurement timing window.

The different layer measurement component 835 may generate a first synchronization signal measurement for the at least first base station of the set of base stations on a first frequency layer and may generate a second synchronization signal measurement for the second base station of the set of base stations on a second frequency layer that is different than the first frequency layer. Additionally or alternatively, the different layer measurement component 835 may identify that the first base station and the second base station have a quasi co-location relationship and may schedule measurement of the second synchronization signal measurement to occur less frequently than the first synchronization signal measurement based on the quasi co-location relationship. In some examples, the different layer measurement component 835 may generate a synchronization signal measurement for each base station of the set of base stations that respectively operate on a different inter-frequency (e.g., IFREQ) layer.

The subset classification component 840 may detect cell timings of a second set of base stations that respectively operate on a different inter-frequency (e.g., IFREQ) layer of a set of inter-frequency (e.g., IFREQ) layers (e.g., two or more inter-frequency/IFREQ layers), may identify a subset of the second set of base stations that each transmit a respective synchronization signal within the measurement timing window based on the cell timings, and may classify the subset of the second set of base stations as being in the synchronization group. In some examples, the subset classification component 840 may identify a duration of the measurement timing window based on a symbol timing tolerance condition and an intra-band carrier aggregation tolerance condition (e.g., T1, T2, T1+T2, etc.) and may identify that the subset of the second set of base stations each transmit a respective synchronization signal within the measurement timing window. Additionally or alternatively, the subset classification component 840 may identify a location of the measurement timing window in time based on a timing of a serving base station of the second set of base stations and may identify that the subset of the second set of base stations each transmit a respective synchronization signal within the measurement timing window based on the location of the measurement timing window.

The measurement window parameters component 845 may identify a periodicity of the measurement timing window. Accordingly, the measurement window parameters component 845 may generate a subsequent synchronization signal measurement for each base station of the set of base stations based on the periodicity. In some examples, the measurement window parameters component 845 may determine a preconfiguration that indicates the periodicity or receiving control signaling that indicates the periodicity. Additionally or alternatively, the measurement window parameters component 845 may receive control signaling indicating a measurement gap corresponding to the measurement timing window and may schedule measurement of the set of base stations within the measurement gap.

Figure 9:
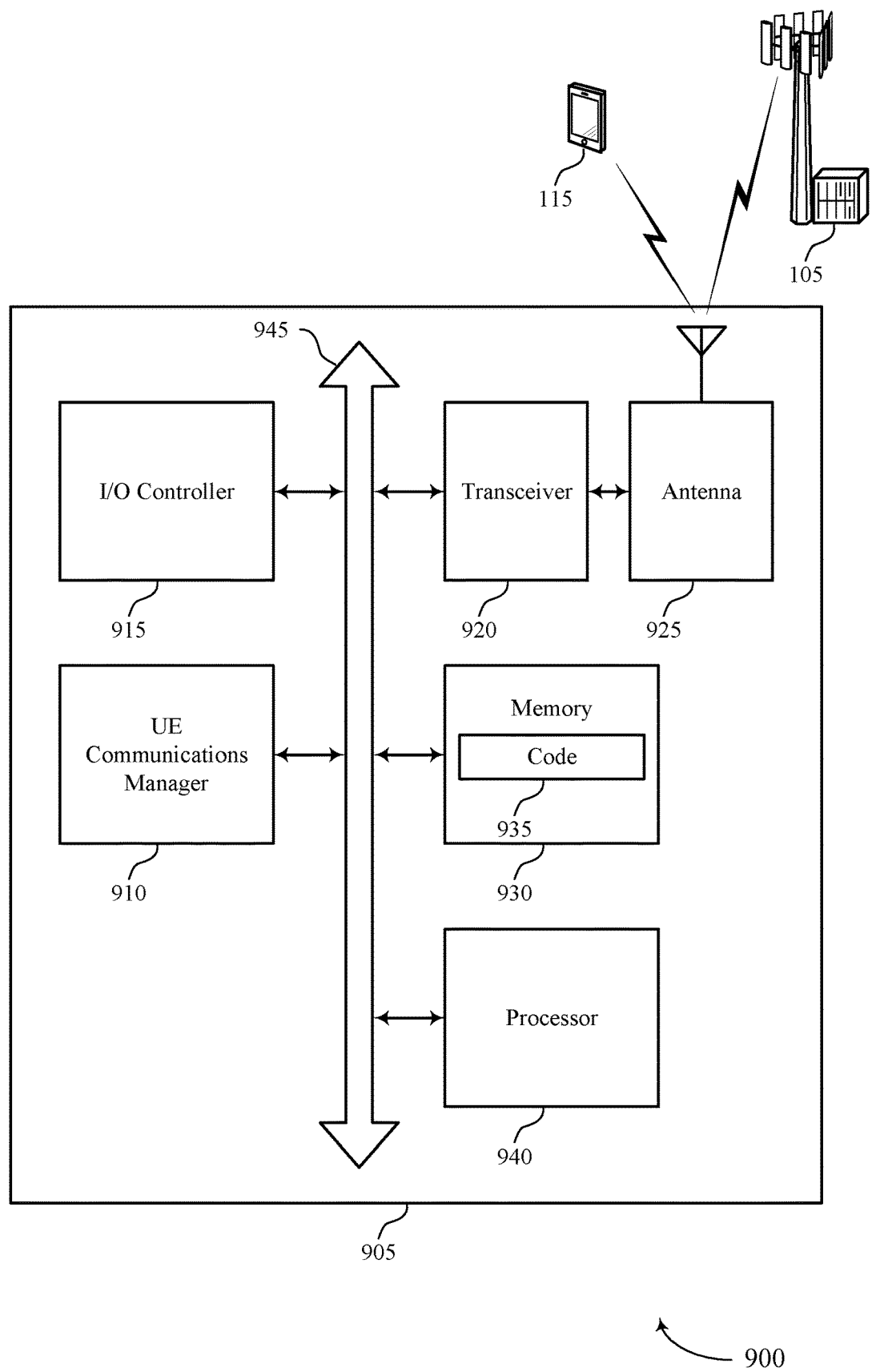
FIG. 9 shows a diagram of a system including a device that supports power savings while performing multiple concurrent cell searches in accordance with aspects of the present disclosure.

FIG. 9 shows a diagram of a system 900 including a device 905 that supports power savings while performing multiple concurrent cell searches in accordance with aspects of the present disclosure. The device 905 may be an example of or include the components of device 605, device 705, or a UE 115 as described herein. The device 905 may include components for bi-directional voice and data communications including components for transmitting and receiving communications, including a UE communications manager 910, an I/O controller 915, a transceiver 920, an antenna 925, memory 930, and a processor 940. These components may be in electronic communication via one or more buses (e.g., bus 945).

The UE communications manager 910 may identify a set of base stations (e.g., two or more base stations) that are included in a synchronization group, where at least a first base station of the set of base stations operates on a first frequency that is different than a second frequency on which a second base station of the set of base stations operates. Additionally, the UE communications manager 910 may identify a measurement timing window corresponding to the synchronization group. In some cases, the UE communications manager 910 may measure, within the measurement timing window, a respective synchronization signal for each base station of the set of base stations. Subsequently, the UE communications manager 910 may transmit a measurement report that indicates a set of synchronization signal measurements (e.g., two or more synchronization signal measurements for the respective synchronization signal for each base station of the set of base stations).

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting power savings while performing multiple concurrent cell searches).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
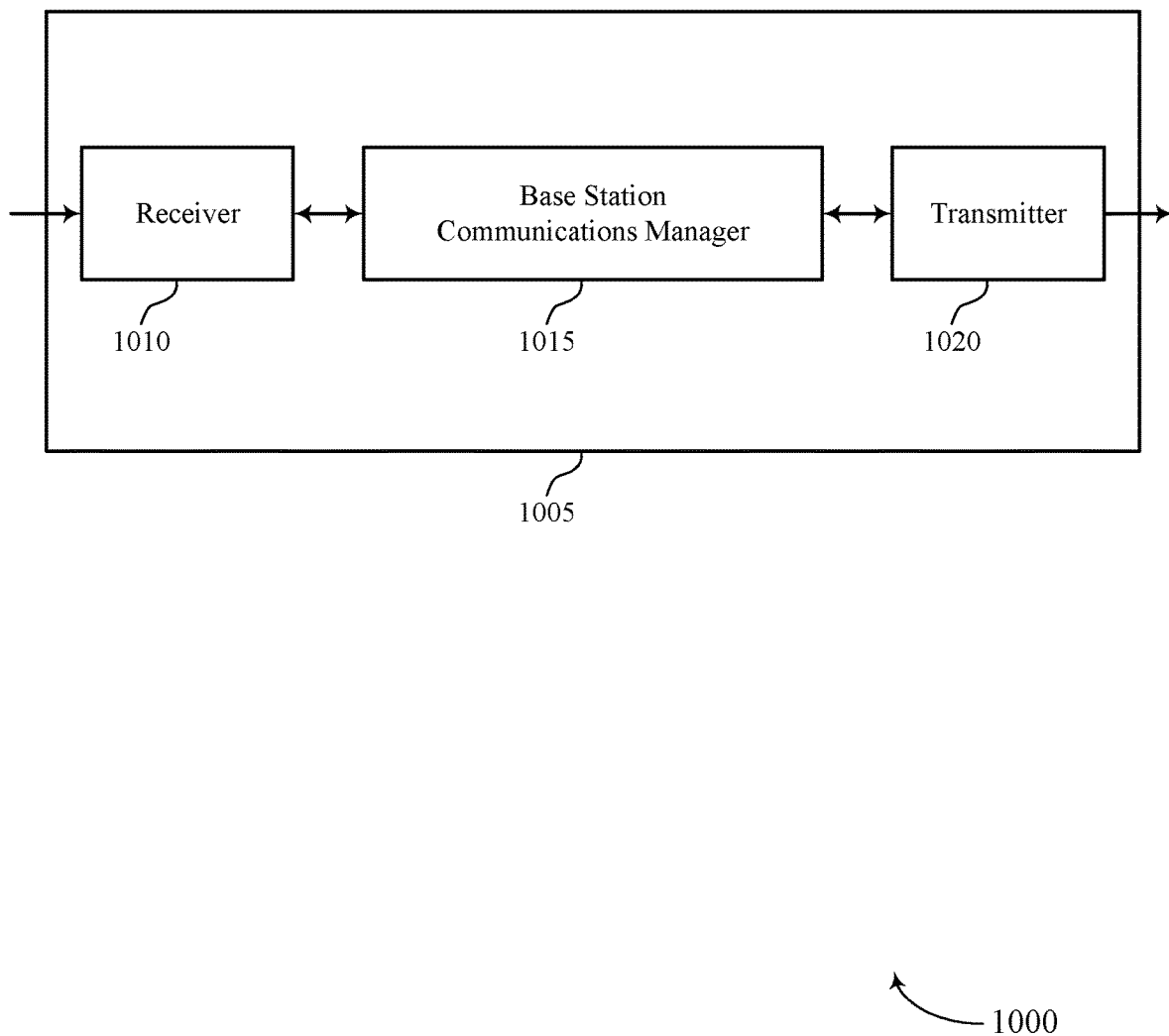
FIGS. 10 and 11 show block diagrams of devices that support power savings while performing multiple concurrent cell searches in accordance with aspects of the present disclosure.

FIG. 10 shows a block diagram 1000 of a device 1005 that supports power savings while performing multiple concurrent cell searches in accordance with aspects of the present disclosure. The device 1005 may be an example of aspects of a base station 105 as described herein. The device 1005 may include a receiver 1010, a base station communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to power savings while performing multiple concurrent cell searches, etc.). Information may be passed on to other components of the device 1005. The receiver 1010 may be an example of aspects of the transceiver 1320 described with reference to FIG. 13. The receiver 1010 may utilize a single antenna or a set of antennas.

The base station communications manager 1015 may transmit, to a UE, an indicator of a set of base stations (e.g., two or more base stations) included in a synchronization group, where at least a first base station of the set of base stations operates on a first frequency that is different than a second frequency on which a second base station of the set of base stations operates. In some cases, the base station communications manager 1015 may identify a measurement timing window corresponding to the synchronization group. Additionally, the base station communications manager 1015 may transmit, within the measurement timing window, a synchronization signal. Subsequently, the base station communications manager 1015 may receive, from the UE, a measurement report that indicates a respective synchronization signal measurement for each of the set of base stations. The base station communications manager 1015 may be an example of aspects of the base station communications manager 1310 described herein.

The base station communications manager 1015, or its sub-components, may be implemented in hardware, code (e.g., software or firmware) executed by a processor, or any combination thereof. If implemented in code executed by a processor, the functions of the base station communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1015, or its sub-components, may be physically located at various positions, including being distributed such that portions of functions are implemented at different physical locations by one or more physical components. In some examples, the base station communications manager 1015, or its sub-components, may be a separate and distinct component in accordance with various aspects of the present disclosure. In some examples, the base station communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
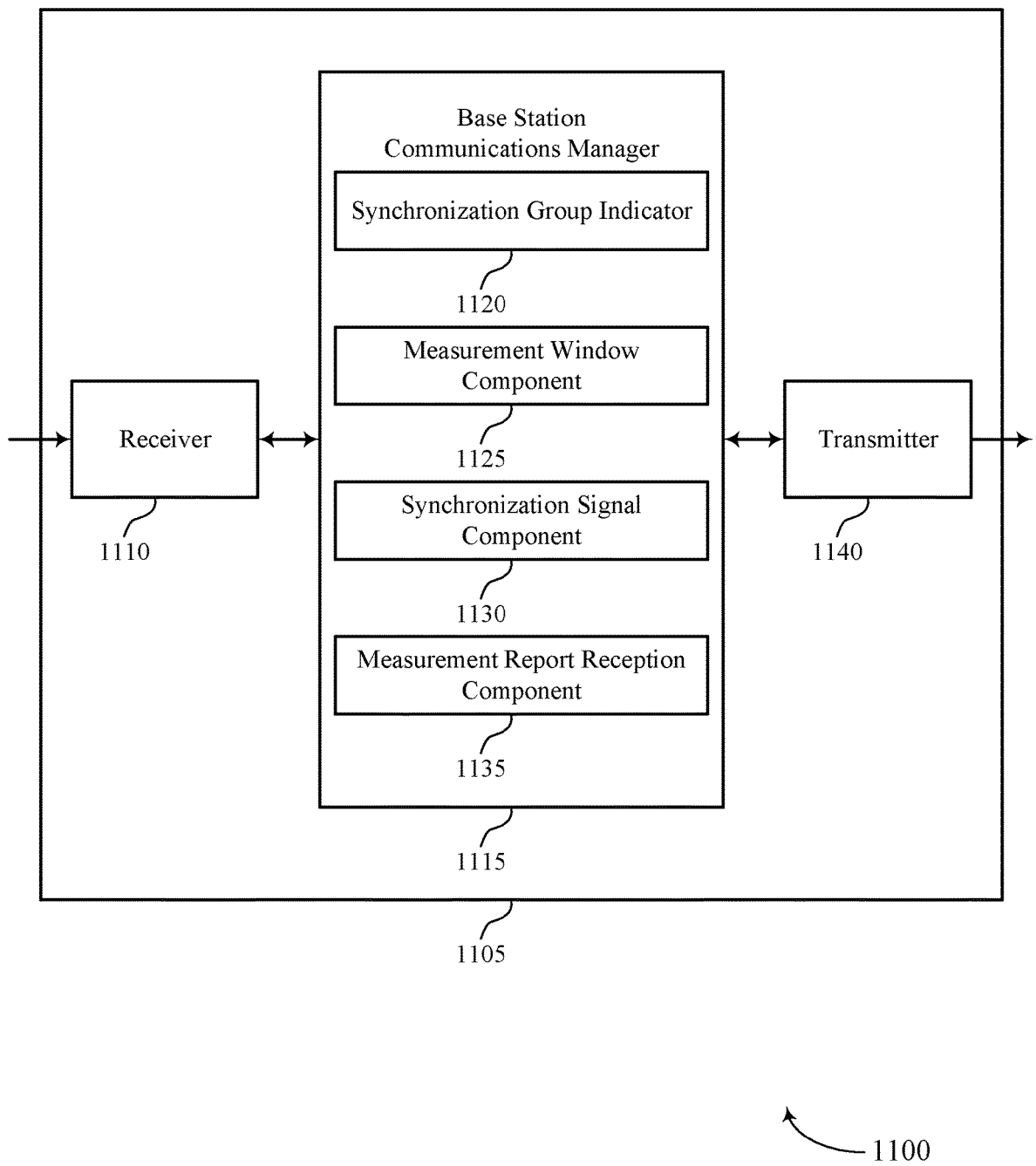

FIG. 11 shows a block diagram 1100 of a device 1105 that supports power savings while performing multiple concurrent cell searches in accordance with aspects of the present disclosure. The device 1105 may be an example of aspects of a device 1005, or a base station 105 as described herein. The device 1105 may include a receiver 1110, a base station communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to power savings while performing multiple concurrent cell searches, etc.). Information may be passed on to other components of the device 1105. The receiver 1110 may be an example of aspects of the transceiver 1320 described with reference to FIG. 13. The receiver 1110 may utilize a single antenna or a set of antennas.

The base station communications manager 1115 may be an example of aspects of the base station communications manager 1015 as described herein. The base station communications manager 1115 may include a synchronization group indicator 1120, a measurement window component 1125, a synchronization signal component 1130, and a measurement report reception component 1135. The base station communications manager 1115 may be an example of aspects of the base station communications manager 1310 described herein.

The synchronization group indicator 1120 may transmit, to a UE, an indicator of a set of base stations (e.g., two or more base stations) included in a synchronization group, where at least a first base station of the set of base stations operates on a first frequency that is different than a second frequency on which a second base station of the set of base stations operates.

The measurement window component 1125 may identify a measurement timing window corresponding to the synchronization group.

The synchronization signal component 1130 may transmit, within the measurement timing window, a synchronization signal.

The measurement report reception component 1135 may receive, from the UE, a measurement report that indicates a respective synchronization signal measurement for each of the set of base stations.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
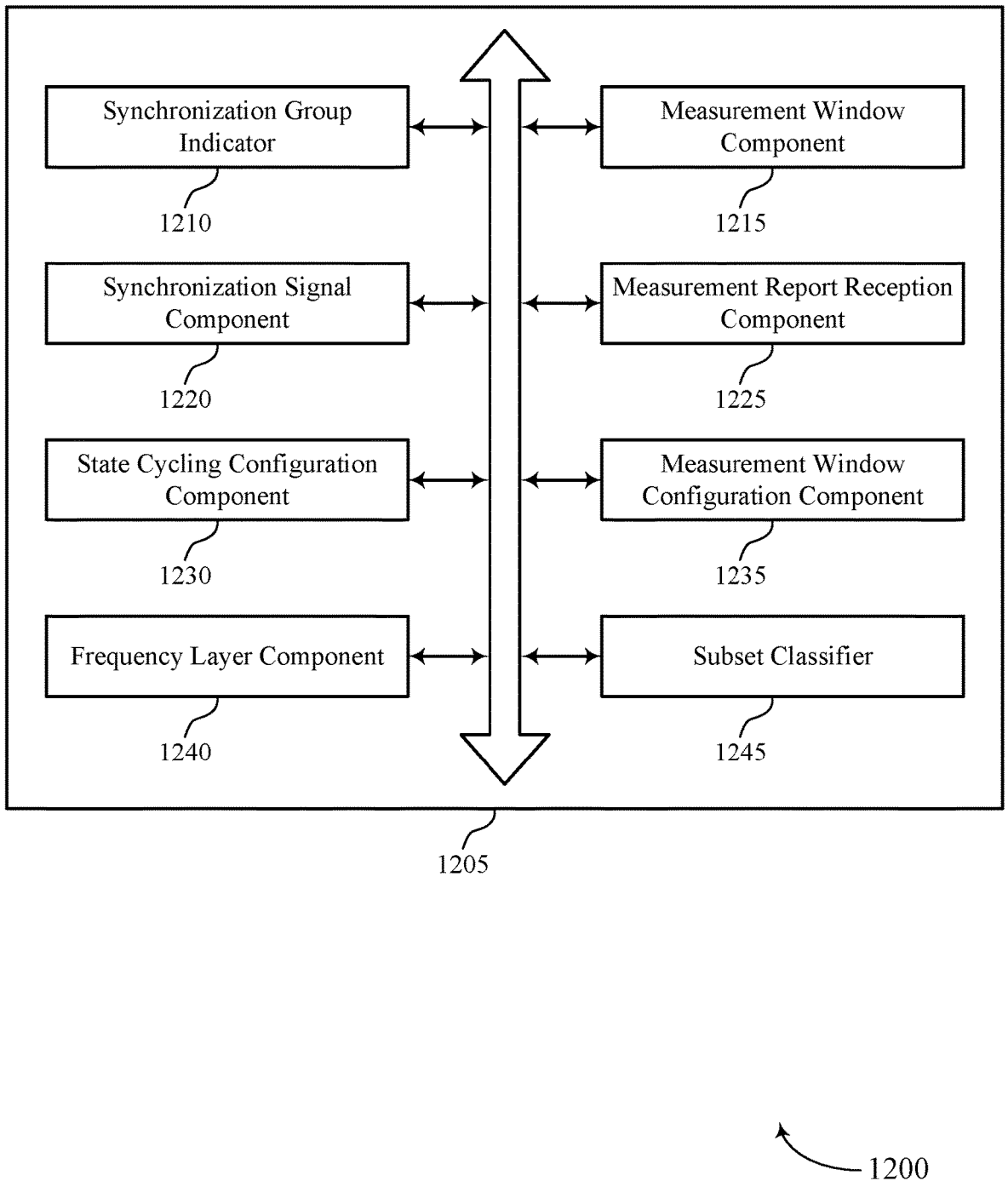
FIG. 12 shows a block diagram of a base station communications manager that supports power savings while performing multiple concurrent cell searches in accordance with aspects of the present disclosure.

FIG. 12 shows a block diagram 1200 of a base station communications manager 1205 that supports power savings while performing multiple concurrent cell searches in accordance with aspects of the present disclosure. The base station communications manager 1205 may be an example of aspects of a base station communications manager 1015, a base station communications manager 1115, or a base station communications manager 1310 described herein. The base station communications manager 1205 may include a synchronization group indicator 1210, a measurement window component 1215, a synchronization signal component 1220, a measurement report reception component 1225, a state cycling configuration component 1230, a measurement window configuration component 1235, a frequency layer component 1240, and a subset classifier 1245. Each of these modules may communicate, directly or indirectly, with one another (e.g., via one or more buses).

The synchronization group indicator 1210 may transmit, to a UE, an indicator of a set of base stations (e.g., two or more base stations) included in a synchronization group, where at least a first base station of the set of base stations operates on a first frequency that is different than a second frequency on which a second base station of the set of base stations operates.

The measurement window component 1215 may identify a measurement timing window corresponding to the synchronization group. In some examples, the measurement window component 1215 may identify a symbol timing tolerance condition for a band and an intra-band carrier aggregation tolerance condition (e.g., T1, T2, T1+T2, etc., as described above) and may identify, based on the symbol timing tolerance condition for the band and the intra-band carrier aggregation tolerance condition, a duration of the measurement timing window. Additionally or alternatively, the measurement window component 1215 may identify a timing of a serving base station and may identify a location of the measurement timing window in time based on the timing of the serving base station.

The synchronization signal component 1220 may transmit, within the measurement timing window, a synchronization signal.

The measurement report reception component 1225 may receive, from the UE, a measurement report that indicates a respective synchronization signal measurement for each of the set of base stations.

The state cycling configuration component 1230 may configure the UE to cycle between operating in a measurement power state during the measurement timing window and a low power state outside of the measurement timing window.

The measurement window configuration component 1235 may configure the UE with a measurement gap for measuring the set of base stations within the measurement timing window. In some examples, the measurement window configuration component 1235 may transmit control signaling that indicates a periodicity of the measurement timing window.

The frequency layer component 1240 may transmit the synchronization signal within a same frequency layer used by an additional base station to transmit a second synchronization signal. In some examples, the frequency layer component 1240 may transmit the synchronization signal within a first frequency layer that is different than a second frequency layer used by an additional base station to transmit a second synchronization signal. Additionally or alternatively, the frequency layer component 1240 may identify that the base station and the additional base station have a quasi co-location relationship and may schedule the UE to measure a synchronization signal of the additional base station less frequently than the synchronization signal of the base station based on the quasi co-location relationship.

The subset classifier 1245 may detect cell timings of a second set of base stations that respectively operating on a different inter-frequency (e.g., IFREQ) layer of a set of inter-frequency (e.g., IFREQ) layers (e.g., two or more inter-frequency/IFREQ layers), may identify a subset of the second set of base stations that each transmit a synchronization signal within the measurement timing window based on the cell timings, and may classify the subset of the second set of base stations as being in the synchronization group. In some examples, the subset classifier 1245 may identify a symbol timing tolerance condition for a band and an intra-band carrier aggregation tolerance condition (e.g., T1, T2, T1+T2, etc.), may identify, based on the symbol timing tolerance condition for the band and the intra-band carrier aggregation tolerance condition, a duration of the measurement timing window, may identify a location of the measurement timing window in time based on a timing of a serving base station of the second set of base stations, and may identify that the subset of the second set of base stations each transmit the synchronization signal within the measurement timing window.

Figure 13:
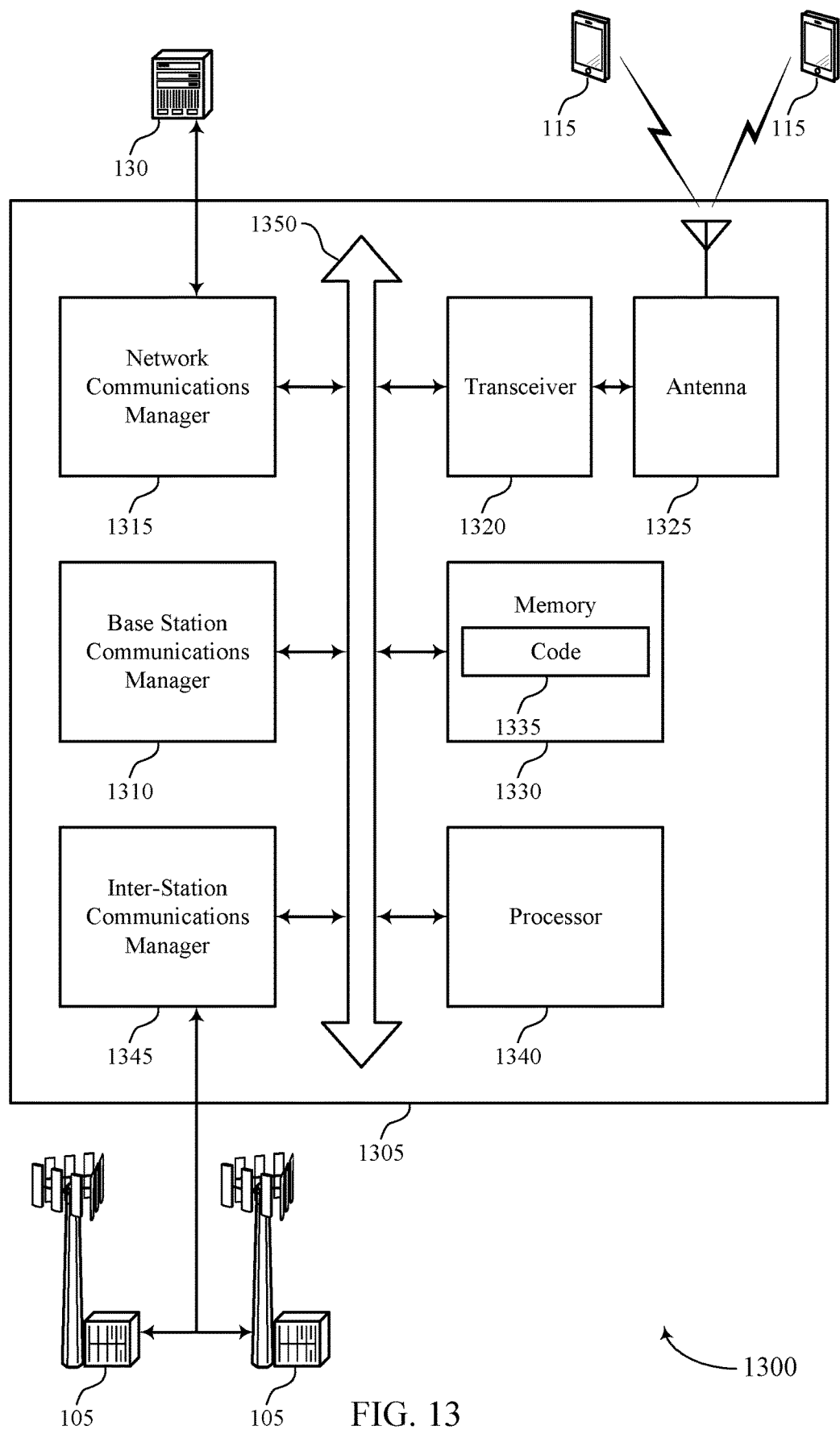
FIG. 13 shows a diagram of a system including a device that supports power savings while performing multiple concurrent cell searches in accordance with aspects of the present disclosure.

FIG. 13 shows a diagram of a system 1300 including a device 1305 that supports power savings while performing multiple concurrent cell searches in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a base station communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The base station communications manager 1310 may transmit, to a UE, an indicator of a set of base stations included in a synchronization group, where at least a first base station of the set of base stations operates on a first frequency that is different than a second frequency on which a second base station of the set of base stations operates. In some cases, the base station communications manager 1310 may identify a measurement timing window corresponding to the synchronization group. Additionally, the base station communications manager 1310 may transmit, within the measurement timing window, a synchronization signal. Subsequently, the base station communications manager 1310 may receive, from the UE, a measurement report that indicates a respective synchronization signal measurement for each of the set of base stations.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting power savings while performing multiple concurrent cell searches).

The inter-station communications manager 1345 may manage communications with other base station 105 and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
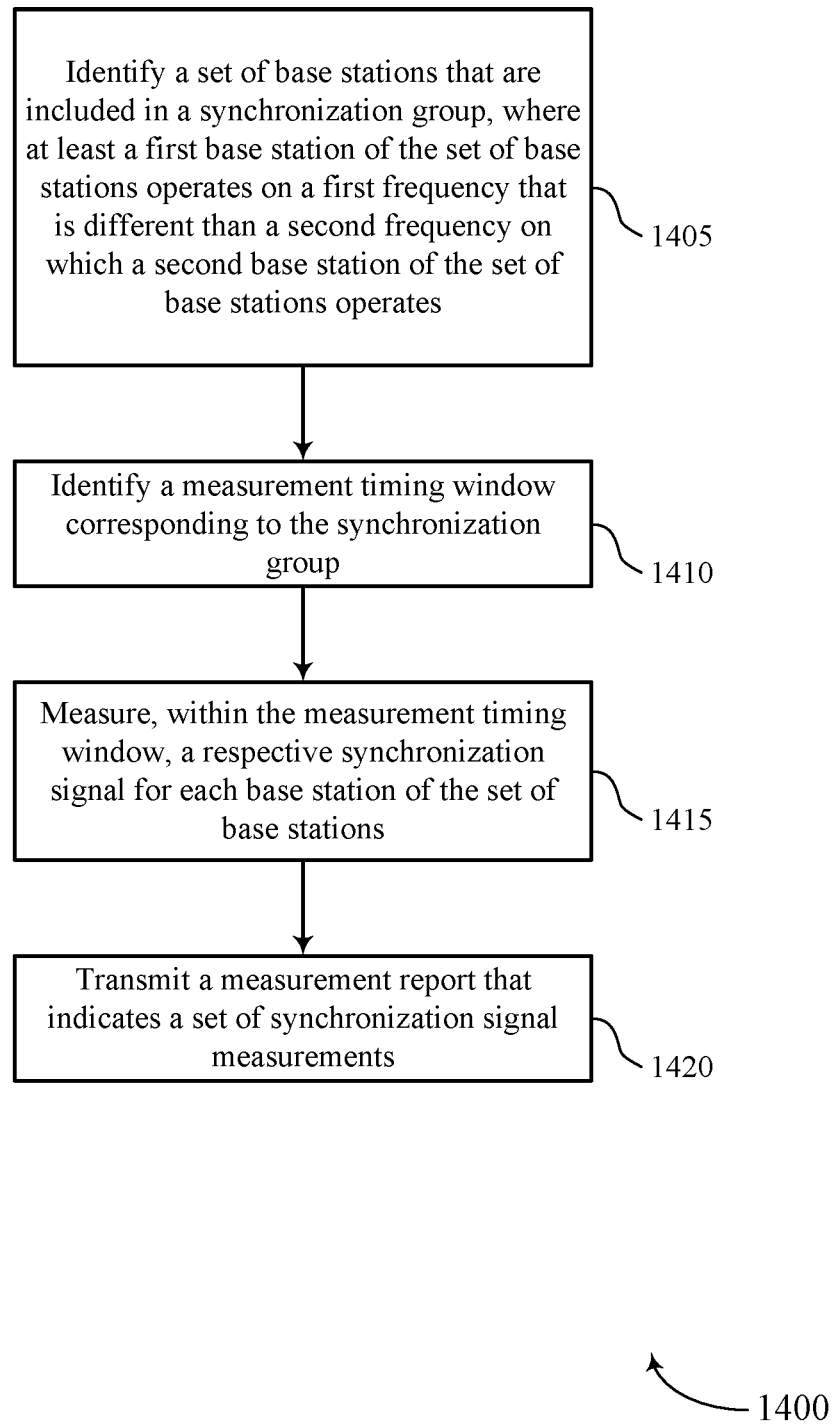
FIGS. 14 through 18 show flowcharts illustrating methods that support power savings while performing multiple concurrent cell searches in accordance with aspects of the present disclosure.

FIG. 14 shows a flowchart illustrating a method 1400 that supports power savings while performing multiple concurrent cell searches in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may identify a set of base stations (e.g., two or more base stations) that are included in a synchronization group, where at least a first base station of the set of base stations operates on a first frequency that is different than a second frequency on which a second base station of the set of base stations operates. The operations of 1405 may be performed according to the methods described herein. In some examples, aspects of the operations of 1405 may be performed by a synchronization group identifier as described with reference to FIGS. 6 through 9. Additionally or alternatively, means for performing 1405 may, but not necessarily, include, for example, antenna 925, transceiver 920, UE communications manager 910, memory 930 (including code 935), processor 940 and/or bus 945.

At 1410, the UE may identify a measurement timing window corresponding to the synchronization group. The operations of 1410 may be performed according to the methods described herein. In some examples, aspects of the operations of 1410 may be performed by a measurement timing window identifier as described with reference to FIGS. 6 through 9. Additionally or alternatively, means for performing 1410 may, but not necessarily, include, for example, antenna 925, transceiver 920, UE communications manager 910, memory 930 (including code 935), processor 940 and/or bus 945.

At 1415, the UE may measure, within the measurement timing window, a respective synchronization signal for each base station of the set of base stations. The operations of 1415 may be performed according to the methods described herein. In some examples, aspects of the operations of 1415 may be performed by a synchronization signal measurement component as described with reference to FIGS. 6 through 9. Additionally or alternatively, means for performing 1415 may, but not necessarily, include, for example, antenna 925, transceiver 920, UE communications manager 910, memory 930 (including code 935), processor 940 and/or bus 945.

At 1420, the UE may transmit a measurement report that indicates a set of synchronization signal measurements (e.g., two or more synchronization signal measurements for the respective synchronization signal for each base station of the set of base stations). The operations of 1420 may be performed according to the methods described herein. In some examples, aspects of the operations of 1420 may be performed by a measurement report component as described with reference to FIGS. 6 through 9. Additionally or alternatively, means for performing 1420 may, but not necessarily, include, for example, antenna 925, transceiver 920, UE communications manager 910, memory 930 (including code 935), processor 940 and/or bus 945.

Figure 15:
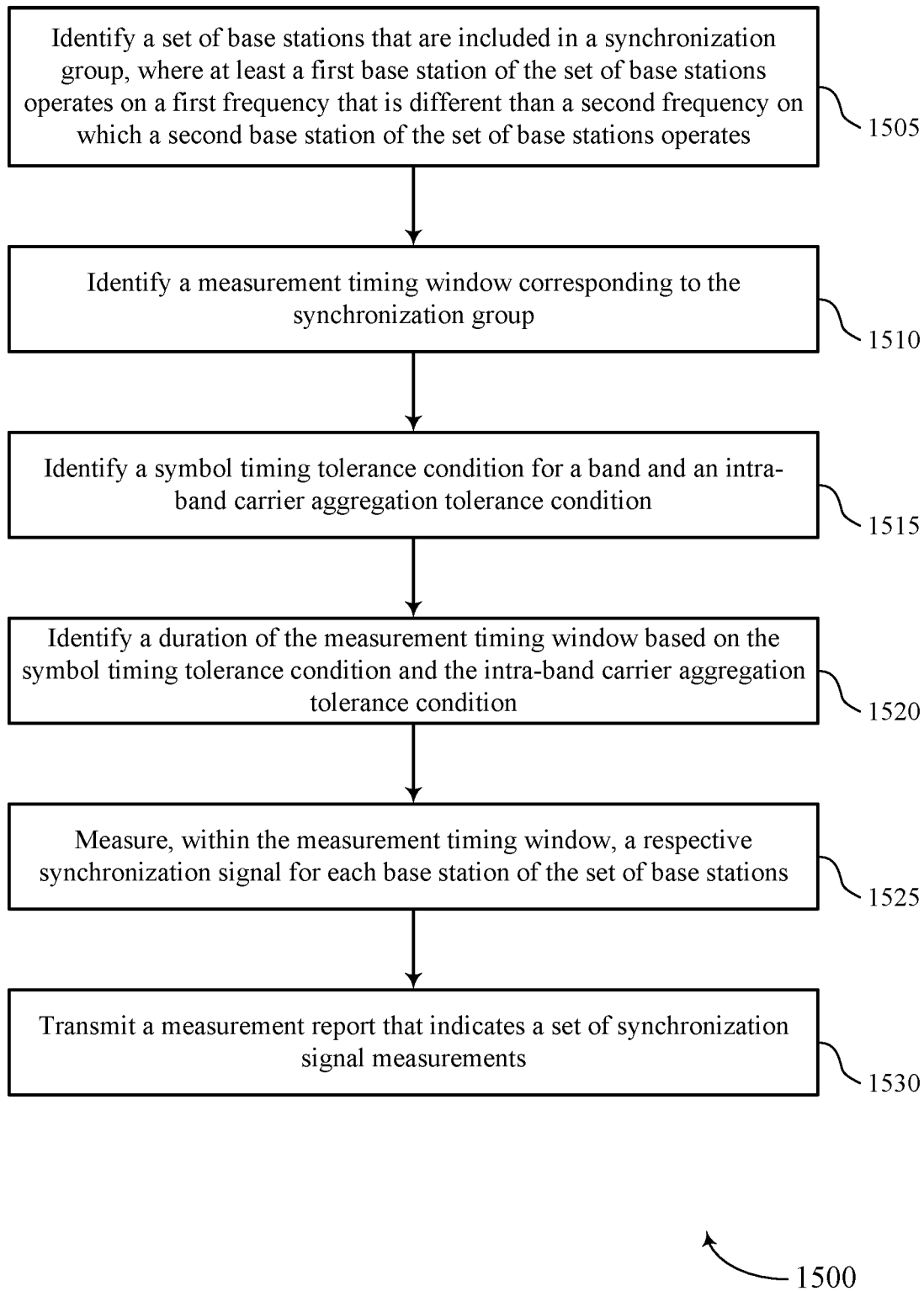

FIG. 15 shows a flowchart illustrating a method 1500 that supports power savings while performing multiple concurrent cell searches in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may identify a set of base stations (e.g., two or more base stations) that are included in a synchronization group, where at least a first base station of the set of base stations operates on a first frequency that is different than a second frequency on which a second base station of the set of base stations operates. The operations of 1505 may be performed according to the methods described herein. In some examples, aspects of the operations of 1505 may be performed by a synchronization group identifier as described with reference to FIGS. 6 through 9. Additionally or alternatively, means for performing 1505 may, but not necessarily, include, for example, antenna 925, transceiver 920, UE communications manager 910, memory 930 (including code 935), processor 940 and/or bus 945.

At 1510, the UE may identify a measurement timing window corresponding to the synchronization group. The operations of 1510 may be performed according to the methods described herein. In some examples, aspects of the operations of 1510 may be performed by a measurement timing window identifier as described with reference to FIGS. 6 through 9. Additionally or alternatively, means for performing 1510 may, but not necessarily, include, for example, antenna 925, transceiver 920, UE communications manager 910, memory 930 (including code 935), processor 940 and/or bus 945.

At 1515, the UE may identify a symbol timing tolerance condition for a band and an intra-band CA tolerance condition (e.g., T1, T2, T1+T2, etc., as described above). The operations of 1515 may be performed according to the methods described herein. In some examples, aspects of the operations of 1515 may be performed by a measurement timing window identifier as described with reference to FIGS. 6 through 9. Additionally or alternatively, means for performing 1515 may, but not necessarily, include, for example, antenna 925, transceiver 920, UE communications manager 910, memory 930 (including code 935), processor 940 and/or bus 945.

At 1520, the UE may identify a duration of the measurement timing window based on the symbol timing tolerance condition for the band and the intra-band carrier aggregation tolerance condition. The operations of 1520 may be performed according to the methods described herein. In some examples, aspects of the operations of 1520 may be performed by a measurement timing window identifier as described with reference to FIGS. 6 through 9. Additionally or alternatively, means for performing 1520 may, but not necessarily, include, for example, antenna 925, transceiver 920, UE communications manager 910, memory 930 (including code 935), processor 940 and/or bus 945.

At 1525, the UE may measure, within the measurement timing window, a respective synchronization signal for each base station of the set of base stations. The operations of 1525 may be performed according to the methods described herein. In some examples, aspects of the operations of 1525 may be performed by a synchronization signal measurement component as described with reference to FIGS. 6 through 9. Additionally or alternatively, means for performing 1525 may, but not necessarily, include, for example, antenna 925, transceiver 920, UE communications manager 910, memory 930 (including code 935), processor 940 and/or bus 945.

At 1530, the UE may transmit a measurement report that indicates a set of synchronization signal measurements (e.g., two or more synchronization signal measurements for the respective synchronization signal for each base station of the set of base stations). The operations of 1530 may be performed according to the methods described herein. In some examples, aspects of the operations of 1530 may be performed by a measurement report component as described with reference to FIGS. 6 through 9. Additionally or alternatively, means for performing 1530 may, but not necessarily, include, for example, antenna 925, transceiver 920, UE communications manager 910, memory 930 (including code 935), processor 940 and/or bus 945.

Figure 16:
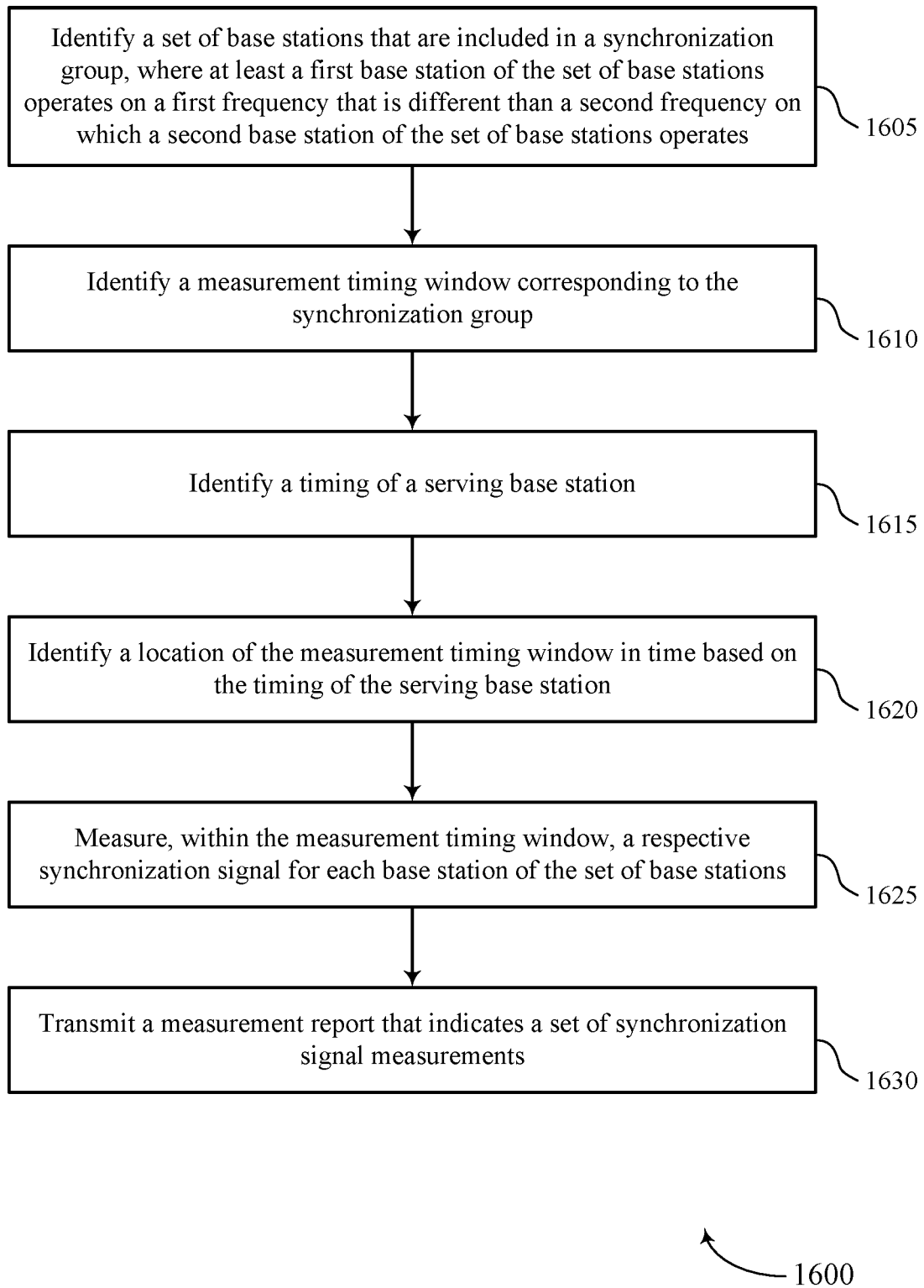

FIG. 16 shows a flowchart illustrating a method 1600 that supports power savings while performing multiple concurrent cell searches in accordance with aspects of the present disclosure. The operations of method 1600 may be implemented by a UE 115 or its components as described herein. For example, the operations of method 1600 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may identify a set of base stations (e.g., two or more base stations) that are included in a synchronization group, where at least a first base station of the set of base stations operates on a first frequency that is different than a second frequency on which a second base station of the set of base stations operates. The operations of 1605 may be performed according to the methods described herein. In some examples, aspects of the operations of 1605 may be performed by a synchronization group identifier as described with reference to FIGS. 6 through 9. Additionally or alternatively, means for performing 1605 may, but not necessarily, include, for example, antenna 925, transceiver 920, UE communications manager 910, memory 930 (including code 935), processor 940 and/or bus 945.

At 1610, the UE may identify a measurement timing window corresponding to the synchronization group. The operations of 1610 may be performed according to the methods described herein. In some examples, aspects of the operations of 1610 may be performed by a measurement timing window identifier as described with reference to FIGS. 6 through 9. Additionally or alternatively, means for performing 1610 may, but not necessarily, include, for example, antenna 925, transceiver 920, UE communications manager 910, memory 930 (including code 935), processor 940 and/or bus 945.

At 1615, the UE may identify a timing of a serving base station. The operations of 1615 may be performed according to the methods described herein. In some examples, aspects of the operations of 1615 may be performed by a measurement timing window identifier as described with reference to FIGS. 6 through 9. Additionally or alternatively, means for performing 1615 may, but not necessarily, include, for example, antenna 925, transceiver 920, UE communications manager 910, memory 930 (including code 935), processor 940 and/or bus 945.

At 1620, the UE may identify a location of the measurement timing window in time based on the timing of the serving base station. The operations of 1620 may be performed according to the methods described herein. In some examples, aspects of the operations of 1620 may be performed by a measurement timing window identifier as described with reference to FIGS. 6 through 9. Additionally or alternatively, means for performing 1620 may, but not necessarily, include, for example, antenna 925, transceiver 920, UE communications manager 910, memory 930 (including code 935), processor 940 and/or bus 945.

At 1625, the UE may measure, within the measurement timing window, a respective synchronization signal for each base station of the set of base stations. The operations of 1625 may be performed according to the methods described herein. In some examples, aspects of the operations of 1625 may be performed by a synchronization signal measurement component as described with reference to FIGS. 6 through 9. Additionally or alternatively, means for performing 1625 may, but not necessarily, include, for example, antenna 925, transceiver 920, UE communications manager 910, memory 930 (including code 935), processor 940 and/or bus 945.

At 1630, the UE may transmit a measurement report that indicates a set of synchronization signal measurements (e.g., two or more synchronization signal measurements for the respective synchronization signal for each base station of the set of base stations). The operations of 1630 may be performed according to the methods described herein. In some examples, aspects of the operations of 1630 may be performed by a measurement report component as described with reference to FIGS. 6 through 9. Additionally or alternatively, means for performing 1630 may, but not necessarily, include, for example, antenna 925, transceiver 920, UE communications manager 910, memory 930 (including code 935), processor 940 and/or bus 945.

Figure 17:
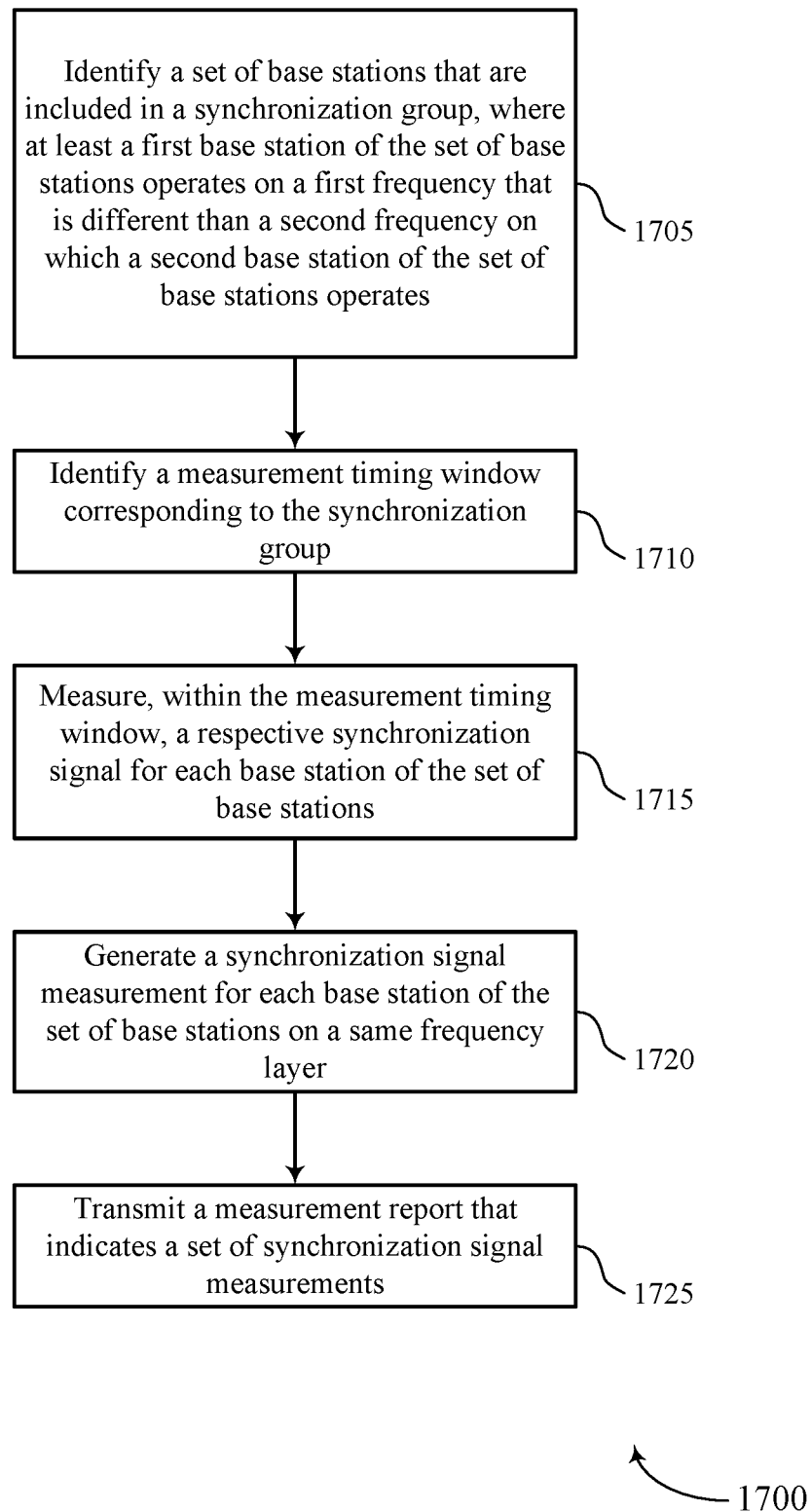

FIG. 17 shows a flowchart illustrating a method 1700 that supports power savings while performing multiple concurrent cell searches in accordance with aspects of the present disclosure. The operations of method 1700 may be implemented by a UE 115 or its components as described herein. For example, the operations of method 1700 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may identify a set of base stations (e.g., two or more base stations) that are included in a synchronization group, where at least a first base station of the set of base stations operates on a first frequency that is different than a second frequency on which a second base station of the set of base stations operates. The operations of 1705 may be performed according to the methods described herein. In some examples, aspects of the operations of 1705 may be performed by a synchronization group identifier as described with reference to FIGS. 6 through 9. Additionally or alternatively, means for performing 1705 may, but not necessarily, include, for example, antenna 925, transceiver 920, UE communications manager 910, memory 930 (including code 935), processor 940 and/or bus 945.

At 1710, the UE may identify a measurement timing window corresponding to the synchronization group. The operations of 1710 may be performed according to the methods described herein. In some examples, aspects of the operations of 1710 may be performed by a measurement timing window identifier as described with reference to FIGS. 6 through 9. Additionally or alternatively, means for performing 1710 may, but not necessarily, include, for example, antenna 925, transceiver 920, UE communications manager 910, memory 930 (including code 935), processor 940 and/or bus 945.

At 1715, the UE may measure, within the measurement timing window, a respective synchronization signal for each base station of the set of base stations. The operations of 1715 may be performed according to the methods described herein. In some examples, aspects of the operations of 1715 may be performed by a synchronization signal measurement component as described with reference to FIGS. 6 through 9. Additionally or alternatively, means for performing 1715 may, but not necessarily, include, for example, antenna 925, transceiver 920, UE communications manager 910, memory 930 (including code 935), processor 940 and/or bus 945.

At 1720, the UE may generate a synchronization signal measurement for each base station of the set of base stations on a same frequency layer. The operations of 1720 may be performed according to the methods described herein. In some examples, aspects of the operations of 1720 may be performed by a synchronization signal measurement component as described with reference to FIGS. 6 through 9. Additionally or alternatively, means for performing 1720 may, but not necessarily, include, for example, antenna 925, transceiver 920, UE communications manager 910, memory 930 (including code 935), processor 940 and/or bus 945.

At 1725, the UE may transmit a measurement report that indicates a set of synchronization signal measurements (e.g., two or more synchronization signal measurements for the respective synchronization signal for each base station of the set of base stations). The operations of 1725 may be performed according to the methods described herein. In some examples, aspects of the operations of 1725 may be performed by a measurement report component as described with reference to FIGS. 6 through 9. Additionally or alternatively, means for performing 1725 may, but not necessarily, include, for example, antenna 925, transceiver 920, UE communications manager 910, memory 930 (including code 935), processor 940 and/or bus 945.

Figure 18:
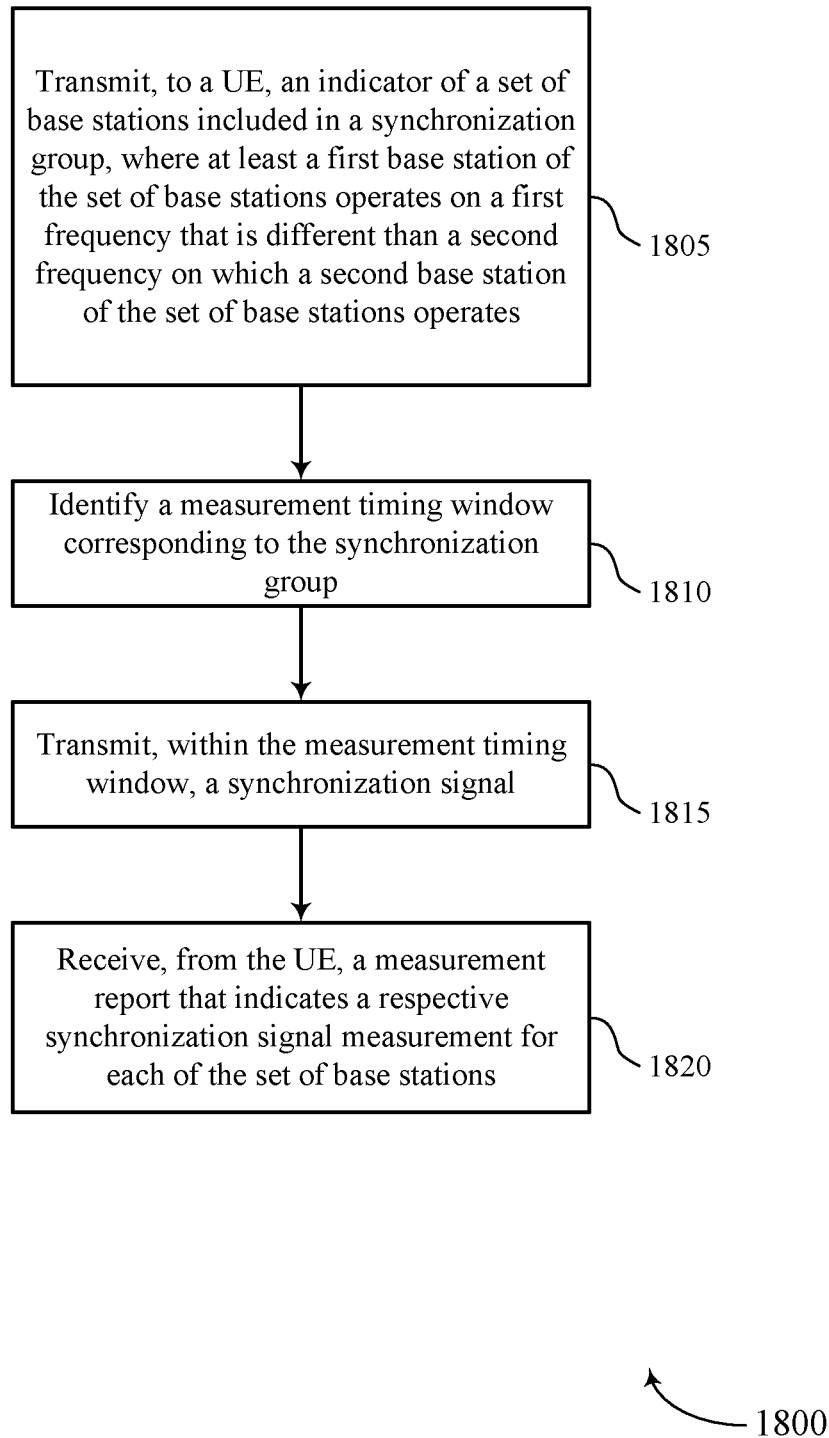

FIG. 18 shows a flowchart illustrating a method 1800 that supports power savings while performing multiple concurrent cell searches in accordance with aspects of the present disclosure. The operations of method 1800 may be implemented by a base station 105 or its components as described herein. For example, the operations of method 1800 may be performed by a base station communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may transmit, to a UE, an indicator of a set of base stations (e.g., two or more base stations) included in a synchronization group, where at least a first base station of the set of base stations operates on a first frequency that is different than a second frequency on which a second base station of the set of base stations operates. The operations of 1805 may be performed according to the methods described herein. In some examples, aspects of the operations of 1805 may be performed by a synchronization group indicator as described with reference to FIGS. 10 through 13. Additionally or alternatively, means for performing 1805 may, but not necessarily, include, for example, antenna 1325, transceiver 1320, base station communications manager 1310, memory 1330 (including code 1335), processor 1340 and/or bus 1350.

At 1810, the base station may identify a measurement timing window corresponding to the synchronization group. The operations of 1810 may be performed according to the methods described herein. In some examples, aspects of the operations of 1810 may be performed by a measurement window component as described with reference to FIGS. 10 through 13. Additionally or alternatively, means for performing 1810 may, but not necessarily, include, for example, antenna 1325, transceiver 1320, base station communications manager 1310, memory 1330 (including code 1335), processor 1340 and/or bus 1350.

At 1815, the base station may transmit, within the measurement timing window, a synchronization signal. The operations of 1815 may be performed according to the methods described herein. In some examples, aspects of the operations of 1815 may be performed by a synchronization signal component as described with reference to FIGS. 10 through 13. Additionally or alternatively, means for performing 1815 may, but not necessarily, include, for example, antenna 1325, transceiver 1320, base station communications manager 1310, memory 1330 (including code 1335), processor 1340 and/or bus 1350.

At 1820, the base station may receive, from the UE, a measurement report that indicates a respective synchronization signal measurement for each of the set of base stations. The operations of 1820 may be performed according to the methods described herein. In some examples, aspects of the operations of 1820 may be performed by a measurement report reception component as described with reference to FIGS. 10 through 13. Additionally or alternatively, means for performing 1820 may, but not necessarily, include, for example, antenna 1325, transceiver 1320, base station communications manager 1310, memory 1330 (including code 1335), processor 1340 and/or bus 1350.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment (UE), comprising:
    identifying a set of base stations that are included in a synchronization group, wherein at least a first base station of the set of base stations operates on a first frequency that is different than a second frequency on which a second base station of the set of base stations operates;
    identifying a measurement timing window corresponding to the synchronization group by
        identifying a symbol timing tolerance condition for a band and an intra-band carrier aggregation tolerance condition, and
        identifying a duration of the measurement timing window based at least in part on the symbol timing tolerance condition for the band and the intra-band carrier aggregation tolerance condition;
    measuring, within the measurement timing window, a respective synchronization signal for each base station of the set of base stations; and
    transmitting a measurement report that indicates a set of synchronization signal measurements.

2. The method of claim 1, further comprising:
    cycling between operating in a measurement power state during the measurement timing window and a lower power state outside of the measurement timing window.

3. The method of claim 1, wherein identifying the measurement timing window further comprises:
    identifying a timing of a serving base station; and
    identifying a location of the measurement timing window in time based at least in part on the timing of the serving base station.

4. The method of claim 1, wherein measuring the synchronization signal for each base station of the set of base stations comprises:
    generating a synchronization signal measurement for each base station of the set of base stations on a same frequency layer.

5. The method of claim 1, wherein measuring the synchronization signal for each base station of the set of base stations comprises:
    generating a first synchronization signal measurement for the at least first base station of the set of base stations on a first frequency layer; and
    generating a second synchronization signal measurement for the second base station of the set of base stations on a second frequency layer that is different than the first frequency layer.

6. The method of claim 5, further comprising:
    identifying that the first base station and the second base station have a quasi co-location relationship; and
    scheduling measurement of the second synchronization signal measurement to occur less frequently than the first synchronization signal measurement based at least in part on the quasi co-location relationship.

7. The method of claim 1, wherein measuring the synchronization signal for each base station of the set of base stations comprises:
generating a synchronization signal measurement for each base station of the set of base stations that respectively operate on a different inter-frequency layer.

8. The method of claim 1, wherein measuring the synchronization signal for each base station of the set of base stations comprises:
generating a first synchronization signal measurement for the at least first base station of the set of base stations that operates in accordance with a first radio access technology; and
generating a second synchronization signal measurement for the second base station of the set of base stations that operates in accordance with a second radio access technology.

9. The method of claim 1, wherein identifying the set of base stations that are included in the synchronization group comprises:
detecting cell timings of a second set of base stations that respectively operate on a different inter-frequency layer of a set of inter-frequency layers;
identifying a subset of the second set of base stations that each transmit a respective synchronization signal within the measurement timing window based at least in part on the cell timings; and
classifying the subset of the second set of base stations as being in the synchronization group.

10. The method of claim 9, wherein classifying the subset of the second set of base stations as being in the synchronization group comprises:
identifying that the subset of the second set of base stations each transmit a respective synchronization signal within the measurement timing window.

11. The method of claim 9, wherein classifying the subset of the second set of base stations as being in the synchronization group comprises:
identifying a location of the measurement timing window in time based at least in part on a timing of a serving base station of the second set of base stations; and
identifying that the subset of the second set of base stations each transmit a respective synchronization signal within the measurement timing window based at least in part on the location of the measurement timing window.

12. The method of claim 1, wherein measuring the synchronization signal for each base station of the set of base stations comprises:
monitoring a first set of symbol periods within the measurement timing window corresponding to a first synchronization signal block for a first synchronization signal transmitted by the at least first base station of the set of base stations; and
monitoring a second set of symbol periods within the measurement timing window corresponding to a second synchronization signal block for a second synchronization signal transmitted by the second base station of the set of base stations.

13. The method of claim 1, further comprising:
identifying a periodicity of the measurement timing window; and
generating a subsequent synchronization signal measurement for each base station of the set of base stations based at least in part on the periodicity.

14. The method of claim 13, wherein identifying the periodicity comprises:
determining a preconfiguration that indicates the periodicity or receiving control signaling that indicates the periodicity.

15. The method of claim 1, further comprising:
receiving control signaling indicating a measurement gap corresponding to the measurement timing window; and
scheduling measurement of the set of base stations within the measurement gap.

16. The method of claim 1, wherein identifying the set of base stations that are included in the synchronization group comprises:
receiving control signaling that indicates that the set of base stations are included in the synchronization group.

17. A method for wireless communications by a base station, comprising:
transmitting, to a user equipment (UE), an indicator of a set of base stations included in a synchronization group, wherein at least a first base station of the set of base stations operates on a first frequency that is different than a second frequency on which a second base station of the set of base stations operates;
identifying a measurement timing window corresponding to the synchronization group by
identifying a symbol timing tolerance condition for a band and an intra-band carrier aggregation tolerance condition, and
identifying a duration of the measurement timing window based at least in part on the symbol timing tolerance condition for the band and the intra-band carrier aggregation tolerance condition;
transmitting, within the measurement timing window, a synchronization signal; and
receiving, from the UE, a measurement report that indicates a respective synchronization signal measurement for each of the set of base stations.

18. The method of claim 17, further comprising:
configuring the UE to cycle between operating in a measurement power state during the measurement timing window and a low power state outside of the measurement timing window.

19. The method of claim 17, wherein identifying the measurement timing window further comprises:
identifying a timing of a serving base station; and
identifying a location of the measurement timing window in time based at least in part on the timing of the serving base station.

20. The method of claim 17, further comprising:
configuring the UE with a measurement gap for measuring the set of base stations within the measurement timing window.

21. The method of claim 17, wherein transmitting, within the measurement timing window, the synchronization signal comprises:
transmitting the synchronization signal within a same frequency layer used by an additional base station to transmit a second synchronization signal.

22. The method of claim 17, wherein transmitting, within the measurement timing window, the synchronization signal comprises:
transmitting the synchronization signal within a first frequency layer that is different than a second frequency layer used by an additional base station to transmit a second synchronization signal.

23. The method of claim 22, further comprising:
identifying that the base station and the additional base station have a quasi co-location relationship; and scheduling the UE to measure a synchronization signal of the additional base station less frequently than the synchronization signal of the base station based at least in part on the quasi co-location relationship.

24. The method of claim 17, wherein transmitting the indicator of the set of base stations included in the synchronization group comprises:
  detecting cell timings of a second set of base stations that respectively operating on a different inter-frequency layer of a set of inter-frequency layers;
  identifying a subset of the second set of base stations that each transmit a synchronization signal within the measurement timing window based at least in part on the cell timings; and
  classifying the subset of the second set of base stations as being in the synchronization group.

25. The method of claim 24, wherein classifying the subset of the second set of base stations as being in the synchronization group comprises:
  the identifying, based at least in part on the symbol timing tolerance condition for the band and the intra-band carrier aggregation tolerance condition, the duration of the measurement timing window;
  identifying a location of the measurement timing window in time based at least in part on a timing of a serving base station of the second set of base stations; and
  identifying that the subset of the second set of base stations each transmit the synchronization signal within the measurement timing window.

26. The method of claim 17, further comprising:
  transmitting control signaling that indicates a periodicity of the measurement timing window.

27. An apparatus for wireless communications by a user equipment (UE), comprising:
  a processor,
  a transceiver,
  memory coupled with the processor; and
  instructions stored in the memory and executable by the processor to cause the apparatus to:
    identify a set of base stations that are included in a synchronization group, wherein at least a first base station of the set of base stations operates on a first frequency that is different than a second frequency on which a second base station of the set of base stations operates;
    identify a measurement timing window corresponding to the synchronization group by
      identifying a symbol timing tolerance condition for a band and an intra-band carrier aggregation tolerance condition, and
      identifying a duration of the measurement timing window based at least in part on the symbol timing tolerance condition for the band and the intra-band carrier aggregation tolerance condition;
    measure, within the measurement timing window, a respective synchronization signal for each base station of the set of base stations; and
    transmit, via the transceiver, a measurement report that indicates a set of synchronization signal measurements.

28. The apparatus of claim 27, wherein the instructions stored in the memory and executable by the processor further cause the apparatus to:
  identify a timing of a serving base station;
  identify a location of the measurement timing window in time based at least in part on the timing of the serving base station; and
  cycle between operating in a measurement power state during the measurement timing window and a lower power state outside of the measurement timing window.

29. An apparatus for wireless communications by a base station, comprising:
  a processor,
  a transceiver,
  memory coupled with the processor; and
  instructions stored in the memory and executable by the processor to cause the apparatus to:
    transmit, to a user equipment (UE), an indicator of a set of base stations included in a synchronization group, wherein at least a first base station of the set of base stations operates on a first frequency that is different than a second frequency on which a second base station of the set of base stations operates;
    identify a measurement timing window corresponding to the synchronization group by
      identifying a symbol timing tolerance condition for a band and an intra-band carrier aggregation tolerance condition, and
      identifying a duration of the measurement timing window based at least in part on the symbol timing tolerance condition for the band and the intra-band carrier aggregation tolerance condition;
    transmit, via the transceiver, within the measurement timing window, a synchronization signal; and
    receive, from the UE via the transceiver, a measurement report that indicates a respective synchronization signal measurement for each of the set of base stations.

30. The apparatus of claim 29, wherein the instructions stored in the memory and executable by the processor further cause the apparatus to:
  identify a timing of a serving base station; and
  identify a location of the measurement timing window in time based at least in part on the timing of the serving base station
  configure the UE to cycle between operating in a measurement power state during the measurement timing window and a low power state outside of the measurement timing window.

* * * * *